(12) United States Patent
Carty

(10) Patent No.: US 7,937,969 B2
(45) Date of Patent: May 10, 2011

(54) SELECTIVE BATCHING FOR BORON-CONTAINING GLASSES

(76) Inventor: William M. Carty, Alfred Station, NY (US)

( * ) Notice: Subject to any disclaimer, the term of this patent is extended or adjusted under 35 U.S.C. 154(b) by 556 days.

(21) Appl. No.: 11/845,657

(22) Filed: Aug. 27, 2007

(65) Prior Publication Data

US 2008/0087044 A1    Apr. 17, 2008

Related U.S. Application Data

(63) Continuation-in-part of application No. 10/927,331, filed on Aug. 26, 2004, now Pat. No. 7,260,960.

(51) Int. Cl.
*C03B 5/00* (2006.01)
*C03B 1/00* (2006.01)

(52) U.S. Cl. .................. 65/136.1; 65/134.1

(58) Field of Classification Search ............ 501/27, 501/29
See application file for complete search history.

(56) References Cited

U.S. PATENT DOCUMENTS

| | | | |
|---|---|---|---|
| 1,529,259 A * | 3/1925 | Locke et al. ............... 501/59 |
| 2,260,749 A * | 10/1941 | Kelsey .................... 501/70 |
| 3,065,090 A | 11/1962 | Hopkins |
| 3,081,180 A * | 3/1963 | Krinov .................... 501/29 |
| 3,542,534 A * | 11/1970 | Yamamoto ................. 65/27 |
| 3,753,743 A | 8/1973 | Kakuda et al. |
| 3,914,363 A | 10/1975 | Bedard et al. |
| 3,914,364 A | 10/1975 | Engelleitner et al. |
| 3,956,446 A | 5/1976 | Eirich et al. |
| 4,023,976 A | 5/1977 | Bauer et al. |
| 4,028,131 A * | 6/1977 | Pons ......................... 501/29 |
| 4,031,175 A * | 6/1977 | Cooper ...................... 264/40.7 |
| 4,113,658 A | 9/1978 | Geus |
| 4,235,618 A * | 11/1980 | Henry et al. ............... 65/21.1 |
| 4,325,724 A * | 4/1982 | Froberg .................... 65/474 |
| 4,358,304 A | 11/1982 | Froberg |
| 4,519,814 A * | 5/1985 | Demarest, Jr. ............ 65/27 |
| 4,588,429 A | 5/1986 | Hohman et al. |
| 4,788,046 A | 11/1988 | Barringer et al. |
| 4,920,080 A * | 4/1990 | Demarest, Jr. ............ 501/31 |
| 5,290,334 A | 3/1994 | Alexander |
| 6,211,103 B1 | 4/2001 | Tomaino et al. |
| 6,235,666 B1 * | 5/2001 | Cochran et al. ........... 501/64 |
| 6,271,159 B1 | 8/2001 | Fairchild et al. |
| 6,287,378 B1 | 9/2001 | Fairchild et al. |
| 6,287,997 B1 | 9/2001 | Fairchild et al. |
| 6,336,346 B2 | 1/2002 | Tomaino et al. |

(Continued)

FOREIGN PATENT DOCUMENTS

WO    WO 99/33765 A1 *   7/1999

*Primary Examiner* — Matthew J Daniels
*Assistant Examiner* — Jodi Cohen
(74) *Attorney, Agent, or Firm* — C. John Brannon; Brannon Sowers Hughel PC

(57) ABSTRACT

A method of forming a glass melt, including measuring predetermined amounts of raw materials to define a glass batch, combining predetermined amounts of sources of silica, calcia and boron from the glass batch to yield a first pre-batch, substantially consolidating the first pre-batch into first pre-batch granules, combining predetermined amounts of sources of silica, calcia, and alumina from the glass batch to yield a second pre-batch, mixing the first and second pre-batches and any remaining portion of the glass batch to yield a batch mixture, and heating the batch mixture to yield a glass melt. Typically, the raw materials at least include sources of silica, alumina, calcia and boron and each respective first pre-batch granule defines a cohesive agglomerate.

2 Claims, 10 Drawing Sheets

U.S. PATENT DOCUMENTS

| | | |
|---|---|---|
| 6,358,870 B1 | 3/2002 | Szczesniewski et al. |
| 6,420,289 B1 | 7/2002 | Tomaino et al. |
| 6,664,203 B2 | 12/2003 | Nagashima et al. |
| 6,672,108 B2 * | 1/2004 | Landa et al. ............ 65/134.3 |
| 7,383,699 B2 * | 6/2008 | Hockman ............ 65/135.9 |
| 2002/0198092 A1 * | 12/2002 | Hockman ............ 501/27 |
| 2004/0050106 A1 * | 3/2004 | Murnane ............ 65/134.3 |
| 2007/0021287 A1 * | 1/2007 | Hockman et al. ............ 501/27 |

* cited by examiner

US 7,937,969 B2

SELECTIVE BATCHING FOR BORON-CONTAINING GLASSES

CROSS-REFERENCE TO RELATED APPLICATIONS

This application is a continuation-in-part of U.S. patent application Ser. No. 10/927,331, filed Aug. 26, 2004, and issued as U.S. Pat. No. 7,260,960 on Aug. 28, 2007, which claims priority to then co-pending PCT patent application Ser. No. PCT/US03/05962, filed Feb. 27, 2003.

TECHNICAL FIELD

The novel technology relates generally to selective batching methods and, more particularly, to compositions and methods for formulating boron-containing glass melts that provide improved melting efficiency

BACKGROUND

Conventional glass batching processes are illustrated diagrammatically as FIG. 1. Typical glass batching involves transferring raw materials directly from storage silos into a weigh hopper, weighing the raw materials according to a weight percent (wt %) batch recipe, adding a specified amount of cullet, and mixing the raw batch and the cullet in a large scale mixer. In some cases, the mixer itself functions as a final check-scale for the batch recipe. From the mixer, the mixed batch materials are transferred to one or more hoppers positioned adjacent the end of a glass furnace (melter) where the mixed batch is introduced into the melting tank. Similar batching techniques are nearly universally employed in various glass producing industrial settings, including container glass, fiber-glass, and float glass manufacturing facilities.

After the mixed batch is added to the furnace (melter), uncontrolled reactions are allowed to occur in the melter at various elevated temperatures, both among batch raw material components and between the batch raw material components and resident melt, until a substantially homogenous melt is eventually achieved. The time required for sufficient melting, homogenization and fining defines the total residence time, or the time that the melt resides within the melter tank before being formed into the desired glass product.

FIG. 2 is a schematic illustration showing the reaction paths that the raw material batch components typically follow when reacting with each other and with the melt already present in the furnace, and FIG. 3 is a schematic illustration showing the conventionally uncontrolled melting stages as the newly added batch melts. That is, once the batch is introduced to the furnace, several reactions take place that almost immediately segregate the batch. In float glass production, for example, sodium carbonate ($Na_2CO_3$), calcium carbonate ($CaCO_3$), sodium sulfate ($Na_2SO_4$) and quartz ($SiO_2$) are the most commonly used major raw materials. When water has not been added in an effort to reduce batch segregation in the storage hopper, the first reaction is usually the formation of a eutectic liquid by the reaction of $Na_2CO_3$ and $CaCO_3$ at a temperature of around 785° C.

As shown in FIG. 2, $Na_2CO_3$ and $CaCO_3$ react along reaction Path 1, creating a low viscosity eutectic liquid with a quantity of un-reacted $CaCO_3$. This low viscosity eutectic liquid reacts with residual $CaCO_3$ and quartz along reaction Path 2 to eventually achieve the overall composition of the glass dictated by the batch recipe. An example of a typical float glass composition is approximately 73.5 wt. % $SiO_2$, 12.3 wt. % CaO, and 14.2 wt. % $Na_2O$.

Similar reactions are observed between $Na_2CO_3$, $CaCO_3$, and $Na_2SO_4$. In this case, the eutectic liquid is composed of molten salts having a very low viscosity. That is, the eutectic liquid flows easily, and exhibits flow properties similar to those exhibited by water, which has a viscosity in a range of 1 to 4 mPa·s, or 1 to 4 centipoise. The eutectic liquid reacts with the quartz to eventually provide a homogeneous glass of the desired composition. The formation of this eutectic liquid, however, can increase the tendency for batch segregation within the melter, as the eutectic liquid has very low viscosity and easily flows downhill in the melter to pool at the bottom, leaving an island of high melting point quartz sand. This effectively reverses the efforts of mixing prior to introducing the batch into the melter.

Similar reactions occur in container glass compositions, and in the case of borosilicate fiber-glass production, borate raw materials contribute to similar problems in the initial stages of melting. This segregation process leads to the formation of large-scale domains, or agglomerates, of nearly pure silica that then require excessively long residence times for dissolution into the surrounding liquid melt. This initial segregation then requires re-homogenization within the glass tank prior to forming a homogeneous melt.

Direct evidence of "de-mixing" can be seen in a glass tank during the melting process. Agglomerations (scaled on the order of centimeters in length) of batch raw materials, commonly referred to in the industry as batch logs or turtles, can be seen in various states of melting in the glass tank. Moreover, the phenomenon of large-scale batch segregation in the melter tank is commonly seen in finished glass in the form of defects such as stones, which are mostly composed of undissolved quartz; seeds, which are bubbles that are not liberated from the melt during fining; and cord lines, which are optical distortions caused by local differences in composition. These defects are direct evidence of off-composition glass due to batch de-mixing or incomplete re-mixing that decrease the overall energy and material efficiency of the melter and reduce the quality of the final product. Industrial observations are further supported by technical publications, which also recognize that batch segregation is commonly observed in commercial production. Despite the fact that batch segregation in the (glass tank and the potential defects that can result therefrom) are recognized in the industry, and despite a long felt need to reduce this undesirable behavior and improve melting efficiency and overall quality, the glass industry has not yet successfully addressed these issues with a viable commercial solution.

As mentioned above, material efficiency in glass making is related to reducing losses due to defects such as stones, seeds, and cord lines. Stones are silica particles or agglomerates that have not fully reacted with the melt. The appearance of this type of defect can be decreased by reducing segregation of refractory silica from flux materials. Seeds, which are bubbles that result from incomplete fining, can be reduced by maximizing the timing of the evolution of volatiles early in the melting process and by reducing air trapped in pore spaces. While cullet from some defective glass can be recycled through the process (though glass with stones cannot be recycled), it is more efficient to reduce the amount of in-house cullet from defective glass.

In large scale commercial glass production (e.g., flat glass, container glass, and fiber-glass) where the melting tank volumes are considerably greater (accommodating volumes on the order of tons of molten glass), in situ melt mixing is accomplished by convection currents within the tank and by the movement of evolved gases from decomposition of raw materials. While some mixing and fining is required to remove gaseous bubbles, the expensive and energy intensive processes to improve the mixing of the molten batch can also be attributed to large scale segregation of batch materials.

Considering that physical mixing is but one factor, the efficiency of the melting process is therefore directly related to diffusion or reactions at the quartz-liquid interface. Quartz dissolution is limited by the initial reaction of quartz with the low viscosity eutectic liquid. As melting progresses, the quartz interacts with a liquid that is steadily increasing in silica content and subsequently, viscosity. Therefore, high temperatures are needed within the melting tank to ensure reasonable diffusion rates and reasonable homogeneity. As mentioned above, the residence time of the material in a tank is determined by the time it takes for the batch materials to completely melt and for the resulting liquid to homogenize. In a continuous production situation, the mass of molten glass in the furnace is held constant, and commercially, the minimum mean residence time is of the order of 24 hours of production for container furnaces and 72 hours for flat glass furnaces with roughly half of this time devoted to melting and the other half devoted to fining.

One attempt to improve the batch melting process involved reducing the addition of carbonate and quartz in the raw (unmixed) form. Experiments were conducted using synthetic diopside (CaO MgO $2SiO_2$) instead of a mixture of $CaCO_3$, $MgCO_3$ and quartz. The results showed that the time required to completely dissolve the original batch (i.e., the batch free time) was reduced depending on temperature, and there was also a reduction in fining time. These improvements were attributed to a reduction in the amount of quartz requiring dissolution into the melt.

It is also conventional wisdom that melting (more accurately, bubble removal) is promoted by keeping the viscosity low. As described above, however, the uncontrolled production of low viscosity liquids during the melting process contributes to undesirable batch segregation. Although a melt that fosters lower viscosities overall may improve quartz dissolution and diffusion rates during melting, these benefits can only be achieved after the highest melting point batch components are sufficiently melted and any batch agglomerates are fully reacted in the melt. Thus, in order to improve melting efficiency and reduce the above-described problems associated with de-mixing and segregation, substantial improvements with respect to controlling the glass batch melting behavior are desired.

Another drawback with conventional glass making technology arises from the amount of energy required to maintain a continuous glass melting operation, and the environmental impact of the use of the fossil fuel necessary to provide this energy. Fuel can constitute 25-30% of the cost of manufacturing float glass. The volatility of fuel prices can, of course, at times increase this proportion without warning. Nationwide, the U.S. glass industry uses in excess of 250 trillion BTU annually to produce approximately 21 million tons of glass products; approximately 80% of this energy is supplied by natural gas. Melting one ton of glass theoretically requires only about 2.2 million BTU, but in practice the fuel requirement ranges from about 4.7 to about 6.9 million BTU per ton due to losses and inefficiencies. Because 80% or more of the overall energy used in the manufacture of container glass, fiber-glass, and flat glass is needed for the melting and fining operations, an energy reduction in glass manufacturing through more efficient melting would be desirable. For example, if a flat glass plant producing 400 tons/day of flat glass runs 365 days/year, even the most efficient natural gas-fired plant (4.7 million BTU/ton) consumes approximately 686 billion BTU/year, or 686 million cubic feet of natural gas.

Pollution prevention and reduction of the considerable costs associated with regulatory compliance, as well as improving the overall energy and material efficiency, are critical for reducing the negative environmental impact of glass manufacturing and for making glass manufacturing more economically competitive. For example, a typical float glass plant must spend an average of $2 million dollars for new environmental control systems and about 2.5% of total manufacturing costs on compliance. Thus, a reduction in 10% of the natural gas use in a typical float plant would result in a savings of approximately $285,000 per year in natural gas (conservatively assuming $5/MMBtu). Moreover, reductions in compliance costs associated with additional chemical treatments and operational implementations aimed at reducing pollutant emissions from combustion reactions could also be realized in conjunction with a reduction in the amount of fuel consumed.

Air pollutants emitted from glass industry include:

1) Nitrogen oxides ($NO_x$)
2) Sulfur oxides ($SO_x$)
3) Carbon monoxide (CO)
4) Carbon Dioxide ($CO_2$)

Fossil fuels used for combustion are typically the source of NOx and some COx. The decomposition of carbonate and sulfate raw materials likewise contribute COx and SOx emissions, respectively. Reduction of the residence time of the melt, however, was reduced to the amount of fuel burned per unit of glass produced and improved energy efficiency. This would also foster reduced amounts of emissions such as NOx and fuel-derived $CO_2$ and CO per unit of glass produced.

Residence time is related to the time required to fully melt all of the batch components, and is particularly dependent upon the amount of high-melting point batch components (e.g., silica) in the batch recipe. Although it would be desirable to eliminate free quartz as a raw material additive due to its slow reactivity and high melting point, quartz remains an abundant and economical source of silica, which is a major component of many commercial glass systems.

Boron-containing glass melts, such as E-glass, can present some particular challenges in the glass melting process. A typical E-glass system is comprised of four main chemical components: $B_2O_3$, $SiO_2$, $Al_2O_3$, and CaO. Granular boric acid is one of the major sources for $B_2O_3$ used in the making of E-glass, especially where low sodium content is required in the glass composition. This low sodium content is particularly important in the reinforcement fiber glass industry and in the production of glass for LCD panel displays.

When calcium (e.g. as calcium carbonate) and boron (e.g. as boric acid, boric oxide, or a borate salt), are included in glass formulations low viscosity melts can form at relatively low temperatures in the glass melting process. According to traditional practice, when batch is introduced to the melting furnace several reactions take place that almost immediately segregate the batch. Boric acid ($H_3BO_3$) melts and forms a low viscosity liquid at about 170° C. Both the apparent melt temperature and the viscosity can be substantially reduced by the presence of ambient moisture. Many alkali metal borates exhibit similar incongruent melt behavior, forming a liquid phase at temperatures well below the melt temperature of the final glass composition. Upon further heating, boric acid loses water and forms meta-boric acid ($HBO_2$). With further heating, it forms an anhydrous boric oxide ($B_2O_3$) melt below 500° C. Calcium carbonate releases carbon dioxide forming calcium oxide, which also melts at a relatively low temperature and can flow away from the rest of the batch.

Boric oxide has dual roles in the glass making process; it behaves as a flux during initial melt formation and as a glass former in the structure formation phase. Liquid $B_2O_3$ enhances dissolution of refractory batch constituents in boron-containing glass formulations such as E-glass. However, the appearance of a low viscosity borate melt in the initial stages of the glass making process can cause segregation in the glass tank during melting, thus removing the fluxing agent away from the refractory batch constituents, and limiting its contribution to the dissolution of the remaining batch materials. This process of segregation leads to large-scale zones or agglomerates of nearly pure silica, and potentially, agglomerates of other raw materials, such as calcium carbonate, wollastonite, alumino-silicates (such as kyanite or meta-kaolin), that can require excessively long residence times in large glass melt tanks for dissolution into the surrounding liquid melt, such as on the order of nine hours at 1300° C., higher temperatures, and/or physical mixing aids. Each of these remedial steps results in higher energy use and more time to successfully produce a homogeneous glass melt.

In some cases, melt efficiency suffers due to the formation of refractory crystalline material in the melt. Other problems caused by the presence of liquid $B_2O_3$ in the melting furnace relate to volatile losses of boric oxide. If such volatile losses are excessive, such as when long residence times are required in the melting furnace, it can result in environmental concerns or increased pollution abatement equipment costs, as well as added raw material costs.

Thus, it would be desirable to provide a method for controlling the melting behavior (i.e., reaction paths) of glass batch components within a resident melt to improve melting efficiency, such that the improved melting efficiency enables a decrease in energy usage, reduces the need for chemical fining agents that contribute to air pollutants and raw material cost, decreases pollution while ultimately producing higher quality, lower cost glass products and reduces the occurrence of batch de-mixing and segregation in early melting stages. The novel technology discussed herein addressed this need.

SUMMARY

One aspect of the novel technology is that by adding raw materials to a glass furnace in a controlled fashion, rather than in a random fashion of arbitrarily mixed raw materials, the reaction paths can be controlled to facilitate the melting process. This process is referred to herein as "Selective Batching". Specifically, this novel technology serves to keep ionic species diffusion distances small by preventing the formation of low-viscosity melts that can segregate during the early stages of melting. Still another aspect of this novel technology is to blend the selectively batched granules prior to their introduction to the furnace to facilitate the formation of a homogeneous glass during the melting process. Another aspect of this novel technology is to concentrically granulate selective batch components, with one selective batch mixture coating spheres of the other, eliminating the need for mixing of the granules prior to their introduction into the glass furnace.

It is an object of the novel technology to provide improved glass batching and melting methods.

According to one embodiment of the novel technology, a method of controlling the reaction paths of glass batch components added to a glass melt residing in a glass melter is provided. The glass melt has a melt viscosity ($\eta m$) at a resident melt temperature ($Tm$), measured on an absolute temperature scale (i.e., Kelvin). The method includes the steps of providing a plurality of raw material batch components in amounts according to a batch recipe, wherein the plurality of raw material batch components include at least one of a glass-former material and at least one of a modifier (flux) material. A first portion of the plurality of raw material batch components is selectively combined to provide a first pre-batch mixture of pre-batch mixture having a melting temperature which is in a range of between about 60 and about 90% of the resident melt temperature $Tm$ and a viscosity at the melting temperature that is greater than or equal to the melt viscosity $\eta m/100$. A second portion of the plurality of raw material batch components is also selectively combined to provide a second combination or pre-batch mixture material having a reaction temperature in a range of typically between about 30 and about 120% of the resident melt temperature, and more typically in the range of between about 60 and about 100% of the resident melt temperature, such that the second pre-batch mixture is capable of forming an intermediate compound via a chemical reaction prior to reacting with the glass melt. The first pre-batch mixture, the second pre-batch mixture and any remaining portion of the plurality of raw material batch components are mixed together to form a batch mixture, and the batch mixture is introduced into the glass melter.

The first pre-batch mixture can be provided in various forms. For example, according to one aspect of the first embodiment of the novel technology, the first pre-batch mixture can be provided as a plurality of discrete reaction members formed by pelletizing the first pre-batch mixture prior to the introducing step, wherein reaction member has a composition based on the first pre-batch mixture. Alternatively, the first pre-batch mixture can be provided as a pre-reacted material formed by pre-reacting the first pre-batch mixture to a temperature proximate a specific reaction temperature of the first pre-batch mixture, cooling the pre-reacted first pre-batch mixture, and grinding (if necessary) the pre-reacted first pre-batch mixture to form a plurality of pre-reacted particulates prior to the introducing step. In this case, each of the plurality of pre-reacted particulates has a composition based on the first pre-batch mixture. According to yet another alternative, the first pre-batch mixture can be provided as a frit formed by heating the first pre-batch mixture to a temperature proximate a melting temperature of the first pre-batch mixture, melting the first pre-batch mixture and quenching the first pre-batch mixture to form the frit prior to the introducing step. In this case, as with the discrete reaction members and the pre-reacted particulates, the frit has a composition according to the first pre-batch mixture.

Similarly, the second pre-batch mixture can be provided in a variety of forms. For example, according to another aspect of the first embodiment of the novel technology, the second pre-batch mixture can be provided as a plurality of discrete reaction members formed by pelletizing the second pre-batch mixture prior to the introducing step, wherein the reaction member has a composition based on the second pre-batch mixture. Alternatively, the second pre-batch mixture can be provided as a pre-reacted material formed by pre-reacting the second pre-batch mixture to a temperature proximate a specific reaction temperature of the second pre-batch mixture, cooling the pre-reacted second pre-batch mixture, and grinding (if necessary) the pre-reacted second pre-batch mixture to form a plurality of pre-reacted particulates prior to the introducing step. In this case, each of the plurality of pre-reacted particulates has a composition based on the second pre-batch mixture. According to yet another alternative, the second pre-batch mixture can be provided as a frit formed by heating the second pre-batch mixture to a temperature proximate a melting temperature of the second pre-batch mixture, melting the second pre-batch mixture and quenching the second pre-batch mixture to form the frit prior to the introducing step. In this case, as with the discrete reaction members and the pre-reacted particulates, the frit has a composition according to the second pre-batch mixture.

The plurality of raw material batch components of the novel technology can also include an intermediate material, in addition to the at least one glass-former material and the at least one modifier material. It should be noted that since the novel technology can be applied equally well for any type of glass manufacturing, the exact composition of the pre-batch mixtures will vary according to the batch recipe used in the particular field of glass making. For example, typical soda lime silicate float glass compositions do not include an intermediate material, such as alumina or zirconia, and instead include a plurality of modifiers, such as sodium and calcium, in various carbonate, sulfate, nitrate, and oxide forms, depending upon the raw materials from which they are derived (such as silicate minerals or the like, such as feldspar, added in small amounts).

For glass compositions that include an intermediate material, the first pre-batch mixture can include at least a portion of the intermediate material and at least a portion of at least one of the modifier materials, and the second pre-batch mixture can include at least a portion of at least one of the glass-former material and at least a portion of at least one of the modifier material. Additionally, the second pre-batch mixture can include at least a portion of the intermediate material and at least a portion of at least one of the modifier materials, and the first pre-batch mixture can at least a portion of at least one of the glass-former material and at least a portion of at least one of the modifier material. Ternary sub-systems created by selective batching methods according to the novel technology, rather than binary sub-systems, are particularly applicable when dealing with glasses containing significant levels of alumina.

Although the exact composition of the pre-batch mixtures can vary according to the particular application, the general combinations of raw material batch components according to the novel technology remains constant. That is, the first pre-batch mixture can include at least a portion of at least one of the glass-former materials and at least a portion of at least one of the modifier materials, and the second pre-batch mixture can include at least a portion of at least one of the glass-former materials and at least a portion of another of the modifier materials.

Typically, the term "glass-former material" or glass-former refers to materials which have an MxOy oxide form (where x=1 or 2; y=1-5) and a single O-M bond strength on the order of 80-120 kcal. The glass-former material may be included as a batch component raw material in its oxide form, or may be the product of calculated decomposition reactions of other batch component raw materials, such as carbonates, hydroxides, chlorides, nitrates, sulfides, or multi-component industrial minerals. Glass-formers according to the novel technology may include, for example, oxide forms of Be, Ge, Si, P, and B.

Typically, the term "intermediate material" or intermediate refers to materials which have an MxOy oxide form and a single O-M bond strength on the order of 60-75 kcal. The intermediate material may be included as a batch component raw material in its oxide form, or may be the product of calculated decomposition reactions of other batch component raw materials, such as carbonates, hydroxides, chlorides, nitrates, sulfides, or multi-component industrial minerals. Intermediates according to the novel technology may include, for example, oxide forms of Mn, Mg, Zr, Be, Fe, Al and Ti.

Typically, the term "modifier material" refers to materials which have an MxOy oxide form and a single O-M bond strength on the order of 10-60 kcal, and which substantially perform as fluxing materials during thermal reactions. The modifier material may be included as a batch component raw material in its oxide form, or may be the product of calculated decomposition reactions of other batch component raw materials, such as carbonates, hydroxides, chlorides, nitrates, sulfides, or multi-component industrial minerals. Intermediates according to the novel technology can include, for example, oxide forms of K, Na, Li, Ba, Pb, Sr, Ca, Mg, Mn, and Fe.

It should be noted that, according to the novel technology, modifiers are typically not be selectively combined with other modifiers in the absence of a glass-former or an intermediate, due to the reactive nature (i.e., fluxing behavior) inherent in most typical modifiers. That is, a pre-batch mixture formed from a modifier-modifier selective combination would typically not reduce the occurrence of batch segregation due to modifiers' tendency to form low viscosity eutectic liquid at lower temperatures.

It should also be noted that, according to the novel technology, intermediates and glass-formers are typically not be selectively combined without a modifier to reduce the melting temperature of the pre-batch mixture. That is, an intermediate-glass-former selective combination typically does not yield any significant benefits with respect to narrowing the melting temperature range of the batch components and typically does not exhibit the desired viscosity in the temperature range of the novel technology. Further, beneficial chemical reactions typically do not substantially occur in lieu of melting. Instead, the pre-batch mixture would likely require a longer residence time for melting and homogenization with the resident melt, which would likely decrease the overall melting efficiency.

There are three typical forms discussed above in which each pre-batch mixture can be stabilized prior to being mixed with other pre-batch mixtures and any remaining portions of the batch (e.g., cullet or previously uncombined weight percentages of the glass-formers, modifiers or, if included, intermediates). The novel technology provides method for selectively batching the raw material batch components wherein the first pre-batch mixture and the second pre-batch mixture comprise the same or different forms.

For example, according to one aspect of the first embodiment of the novel technology, the first combination comprises a plurality of discrete reaction members and the second pre-batch mixture comprises a plurality of discrete reaction members. Thus, in this case, each of the first and second pre-batch mixtures are selectively pre-mixed and pelletized to form a pelletized feed stock prior to being mixed with each other and the remaining batch components and being added to the melter. Additionally, according to another aspect of the first embodiment of embodiment of the novel technology, the first pre-batch mixture comprises a plurality of discrete reaction members and the second pre-batch mixture comprises a pre-reacted material. Further, according to yet another aspect of the first embodiment of embodiment of the novel technology, the first pre-batch mixture comprises a plurality of discrete reaction members and the second pre-batch mixture comprises a frit.

The novel technology also provides that the first pre-batch mixture comprises a pre-reacted material and the second pre-batch mixture comprises a plurality of discrete reaction members. Alternatively, the novel technology provides that the first pre-batch mixture comprises a pre-reacted material and the second pre-batch mixture comprises a pre-reacted material. Thus, in this case, each of the first and second pre-batch mixtures are selectively pre-mixed and pre-reacted and, if necessary or desired, ground to form a particulate feed stock material prior to being mixed with each other and the remaining batch components and before being added to the melter. Further, the novel technology provides that the first pre-batch mixture comprises a pre-reacted material and the second pre-batch mixture comprises a frit.

Further, according to another aspect of the first embodiment of the novel technology, the first pre-batch mixture comprises a frit and the second pre-batch mixture comprises a plurality of discrete reaction members. Alternatively, the novel technology provides that the first pre-batch mixture comprises a frit and the second pre-batch mixture comprises a pre-reacted material. Moreover, according to yet another aspect of the first embodiment of the novel technology, the first pre-batch mixture comprises a frit and the second pre-batch mixture comprises a frit. Thus, in this case, each of the first and second pre-batch mixtures are selectively pre-mixed and pre-melted and quenched to form a frit feed stock material prior to being mixed with each other and the remaining batch components and before being added to the melter.

Selectively batching raw materials into mixtures (i.e., the first pre-batch mixture of the first embodiment) that form higher viscosity "endpoints," to control the melting sequence and consequently the viscosity of the molten phase(s), instead of simply mixing all of the batch components together prior to charging, may be done to control the reaction paths within the melter, rather than allowing the melting process to dictate the composition of the melt at various stages. That is, if all of the batch constituents possessed melting points within a narrow temperature range, more uniform melting could be achieved. Accordingly, segregation within the furnace (regardless of magnitude) would be limited, and the time required for glass-homogenization substantially reduced. Furthermore, if de-mixing is reduced, diffusion distances become shortened and batch free time is substantially reduced.

Selectively batching raw materials into a mixture (i.e., the second pre-batch mixture of the first embodiment) that is capable of forming an intermediate compound that may participate in a series of chemical reactions with the glass melt and the other components of the glass batch rather than melting (even at temperatures approaching the resident glass melt temperature) regards the formation of low viscosity eutectic compounds that may increase the tendency for batch segregation. Further, since the intermediate compound does not itself melt per se, the above-mentioned viscosity considerations are minimized in view of the preponderance of solid-state reactions that instead yield a glass melt having a desired composition with improved melting efficiency, for example, by reducing the tendency for the segregation complications that decrease melting efficiency.

The selective batching techniques according to the novel technology alter the reaction sequence during the melting process to create intermediate reaction products that are then more easily reacted with each other, thus improve melting efficiency and significantly reducing the overall energy needed and time required to form a homogeneous melt. The tendency for large scale segregation may also be reduced or substantially eliminated, thus yielding shorter diffusion distances. This, in turn, eliminates the need for downstream mechanical mixing of the melt, such as mechanical stirring, or other physical implementations to improve melting efficiency, for example, bubblers designed to stir and/or to increase the heat capacity of the melt. The time required for sufficient melting and homogenization is substantially reduced, and fining times may likewise be reduced. In lieu of reducing the residence time, however, it is also possible to allow for additional fining time in the current furnace setup to yield a superior glass product.

Controlling the reaction paths of batch components to improve melting efficiency both reduces the residence time of material in the glass tank and the batch-free time. This, in turn, reduces the amount of energy required per unit of glass during made production. For example, if residence time of material in the tank can be reduced by 10% to 20%, a typical float glass plant could reduce the annual natural gas use by about 57 to 114 million cubic foot (for the most efficient 4.7 million BTU per ton), assuming that 83% of the total energy is used for melting. On a nationwide scale of all glass manufacturing, a 10% reduction in residence time could result in a savings of 20 trillion BTU or 16 billion cubic foot of natural gas (assuming 250 trillion BTU, 80% natural gas usage and 1.times.10.sup.3 BTU per cubic foot natural gas).

Sulfur oxides are a decomposition product of saltcake (sodium sulfate) that is typically added to the batch as a fining agent. The improved melting efficiency attributed to the novel technology reduces the need for fining agents such as saltcake ($Na_2SO_4$) and thus, directly reduce $SO_x$ emissions. Reducing these and other harmful emissions reduces the need for the implementation of costly measures to meet environmental emission standards.

According to a second embodiment of the novel technology, a method of controlling the reaction paths of glass batch components added to a glass melt residing in a glass melter is provided. The glass melt has a melt viscosity $\eta m$ at a resident melt temperature Tm, measured on an absolute temperature scale (i.e., Kelvin). The method includes the steps of providing a plurality of raw material batch components in amounts according to a batch recipe, wherein the plurality of raw material batch components include at least one of a glass-former material and at least one of a modifier material. The method also includes the steps of selectively combining a first portion of the plurality of raw material batch components to provide a first pre-batch mixture having a melting temperature which is in a range of typically between about 30 to about 120% of the resident melt temperature and, more typically, of between about 60 to about 90% of the resident melt temperature Tm and a viscosity at the melting temperature which is greater than or equal to the melt viscosity $\eta m/100$, and mixing the first pre-batch mixture and any remaining portion of the plurality of raw material batch components to form a batch mixture. The batch mixture is then introduced into the glass melter According to this second embodiment of the novel technology, the method further includes a step of selectively combining a second portion of the plurality of raw material batch components to provide a second pre-batch mixture having a melting temperature which is in a range of about 60 to about 90% of the resident melt temperature Tm and a viscosity at the melting temperature that is greater than or equal to the melt viscosity $\eta m/100$. The second pre-batch mixture is mixed with the first pre-batch mixture and any remaining portion of the plurality of raw material batch components to form a batch mixture, which is then introduced into the glass melter.

It should be noted that this embodiment of the novel technology is primarily directed to selectively combining the raw material batch components to narrow the melting point range of the batch and to control the viscosity of the batch during melting to improve the melting efficiency and prevent batch segregation, as described above with respect to the first embodiment.

Different combinations of raw material batch components to form the first and second pre-batch mixtures according to the second embodiment of the novel technology are similar to those described above with respect to the first embodiment, and further redundant description thereof is therefore omitted. Likewise, the different forms in which the first and second pre-batch mixtures according to the second embodiment of the novel technology can be stabilized prior to being mixed with each other and with any remaining batch components are similar to those described above with respect to the first embodiment as discussed above.

According to a third embodiment of the novel technology, a method of controlling the reaction paths of glass batch components added to a glass melt residing in a glass melter is provided. The glass melt has a melt viscosity ηm at a resident melt temperature Tm, measured on an absolute temperature scale (i.e., Kelvin). The method includes the steps of providing a plurality of raw material batch components in amounts according to a batch recipe, wherein the plurality of raw material batch components including at least one of a glass-former material and at least one of a modifier material. The method also includes the steps of selectively combining a first portion of the plurality of raw material batch components to provide a first pre-batch mixture having a reaction temperature in a range of typically between about 30 to about 120% of the resident melt temperature and, more typically, of between about 60 to 100% of the resident melt temperature, such that the first pre-batch mixture is capable of forming an intermediate compound via a chemical reaction prior to reacting with the glass melt and mixing the first pre-batch mixture and a remaining portion of the plurality of raw material batch components to form a batch mixture. The batch mixture is then introduced into the glass melter.

According to this third embodiment of the novel technology, the method further includes selectively combining a second portion of the plurality of raw material batch components to provide a second pre-batch mixture having a reaction temperature in a range of about 60 to 100% of the resident melt temperature, such that the second pre-batch mixture is capable of forming an intermediate compound via a chemical reaction prior to reacting with the glass melt. The second pre-batch mixture is mixed with the first pre-batch mixture and any remaining portion of the plurality of raw material batch components to form a batch mixture, which is then introduced into the glass melter.

It should be noted that this third embodiment of the novel technology is primarily directed to selectively combining portion of the raw material batch into a pre-batch mixture that is capable of forming an intermediate compound via a chemical reaction with the glass melt within a certain temperature range of the resident melt temperature to improve the melting efficiency and prevent batch segregation, as described above with respect to the second pre-batch mixture of the first embodiment.

Different combinations of raw material batch components to form the first and second pre-batch mixtures according to the third embodiment of the novel technology are similar to those described above with respect to the first embodiment as discussed above. Likewise, the different forms in which the first and second pre-batch mixtures according to the third embodiment of the novel technology can be stabilized prior to being mixed with each other and with any remaining batch components are similar to those described above with respect to the first embodiment, and further redundant description thereof is therefore omitted.

BRIEF DESCRIPTION OF THE DRAWINGS

For a better understanding of the nature and objects of the novel technology, reference should be made to the following drawings, in which.

DETAILED DESCRIPTION OF THE PREFERRED EMBODIMENTS

Figure 1:
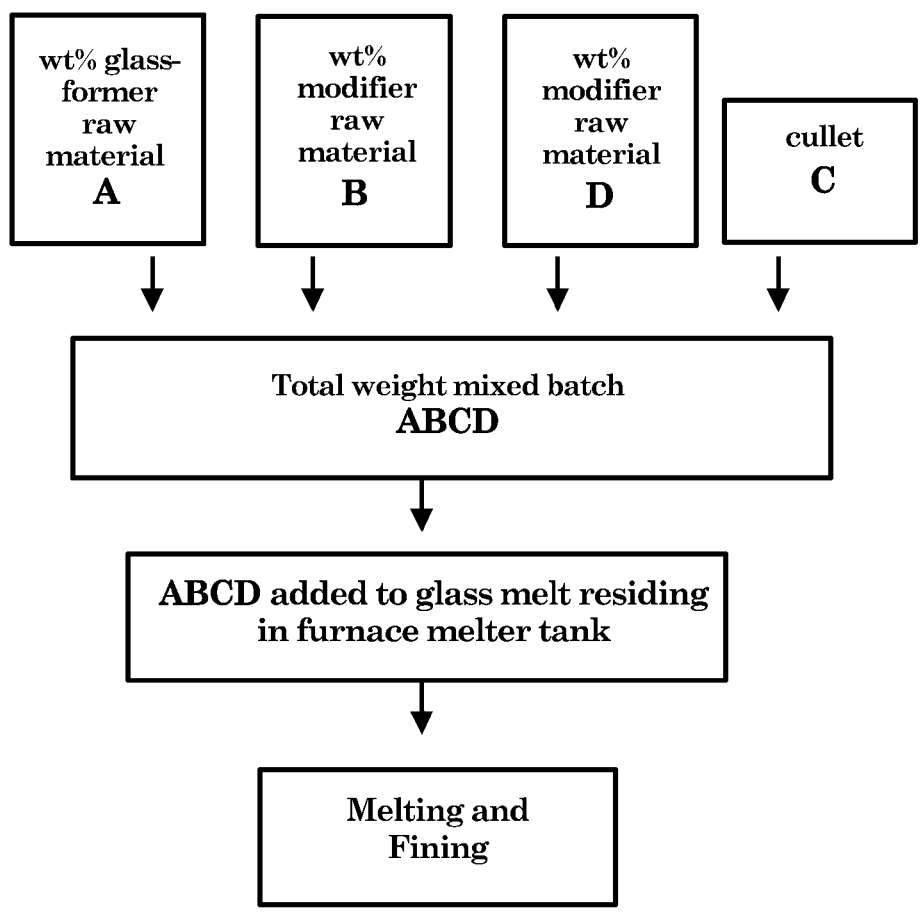
FIG. 1 is a flow diagram illustrating conventional glass batching techniques
Figure 2:
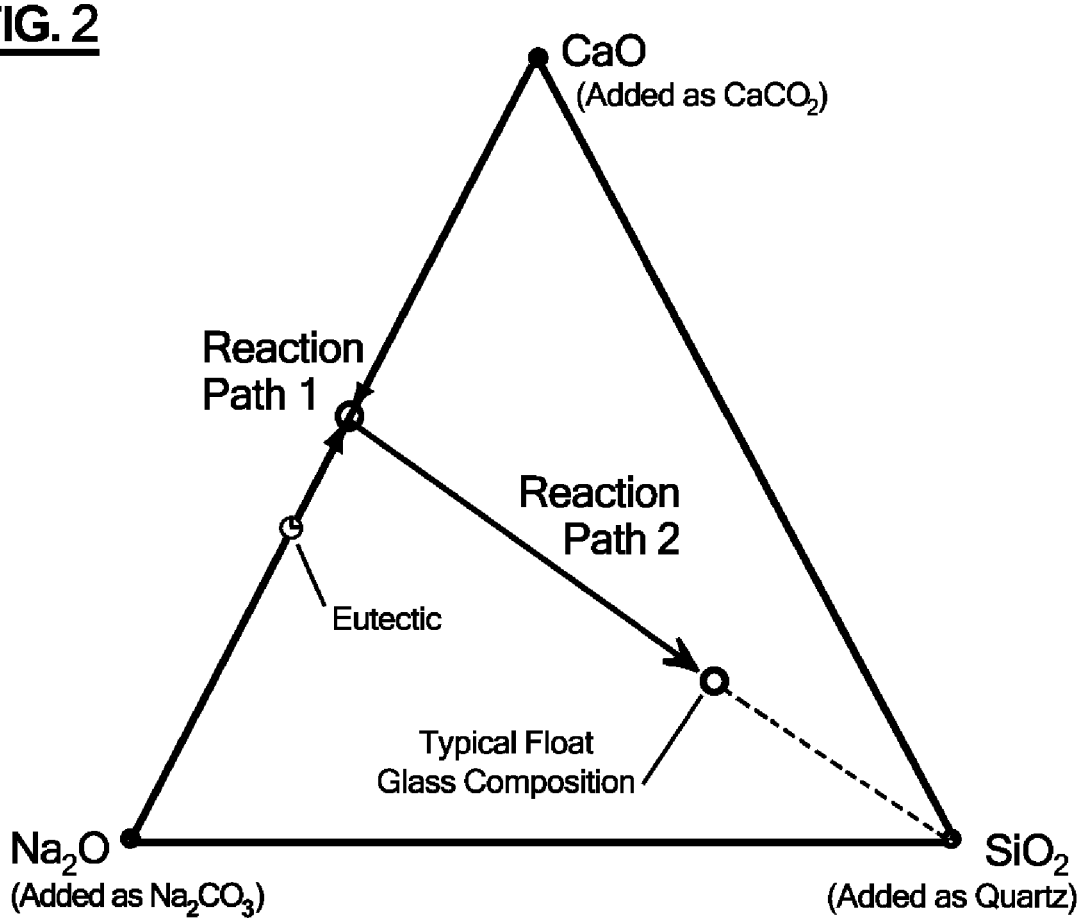
FIG. 2 is a schematic illustration of the conventional batch reaction paths for a typical commercial float glass composition.
Figure 3:
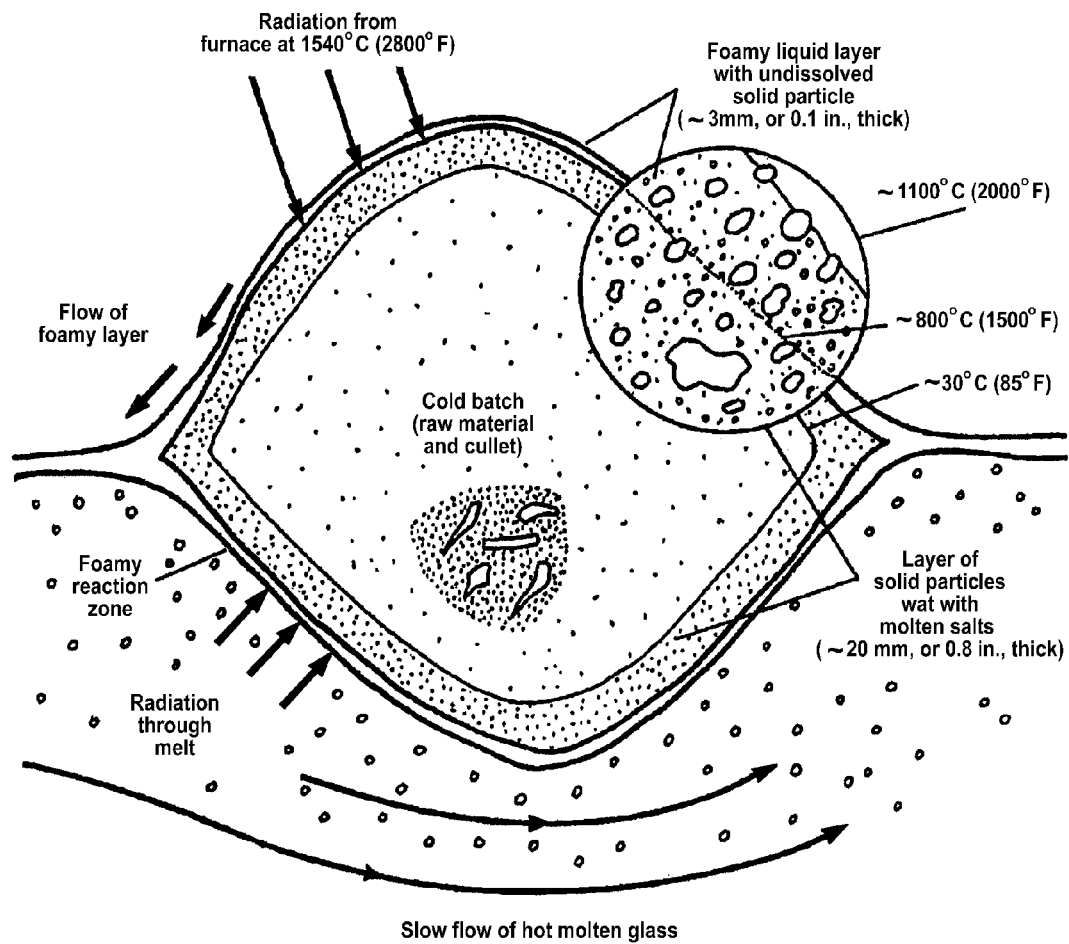
FIG. 3 is a schematic diagram illustrating a conventional batch reaction process.

For the purposes of promoting an understanding of the principles of the invention and presenting its currently understood best mode of operation, reference will now be made to the embodiments illustrated in the drawings and specific language will be used to describe the same. It will nevertheless be understood that no limitation of the scope of the invention is thereby intended, with such alterations and further modifications in the illustrated device and such further applications of the principles of the invention as illustrated therein being contemplated as would normally occur to one skilled in the art to which the invention relates.

According to the novel technology, selective blending of particular combinations of batch raw materials according to the overall batch recipe is performed, rather than the complete blending of the entire batch composition prior to introduction to a glass melter (e.g., furnace tank) having molten glass (hereinafter referred to as "melt") residing therein. Selectively batching in this manner provides intermediate batch reaction products whose thermal characteristics (such as melting point) and Theological properties (such as viscosity) or high temperature reaction behaviors improved melting efficiency and reduce the occurrence of batch constituent segregation during the initial melting stages.

Figure 4:
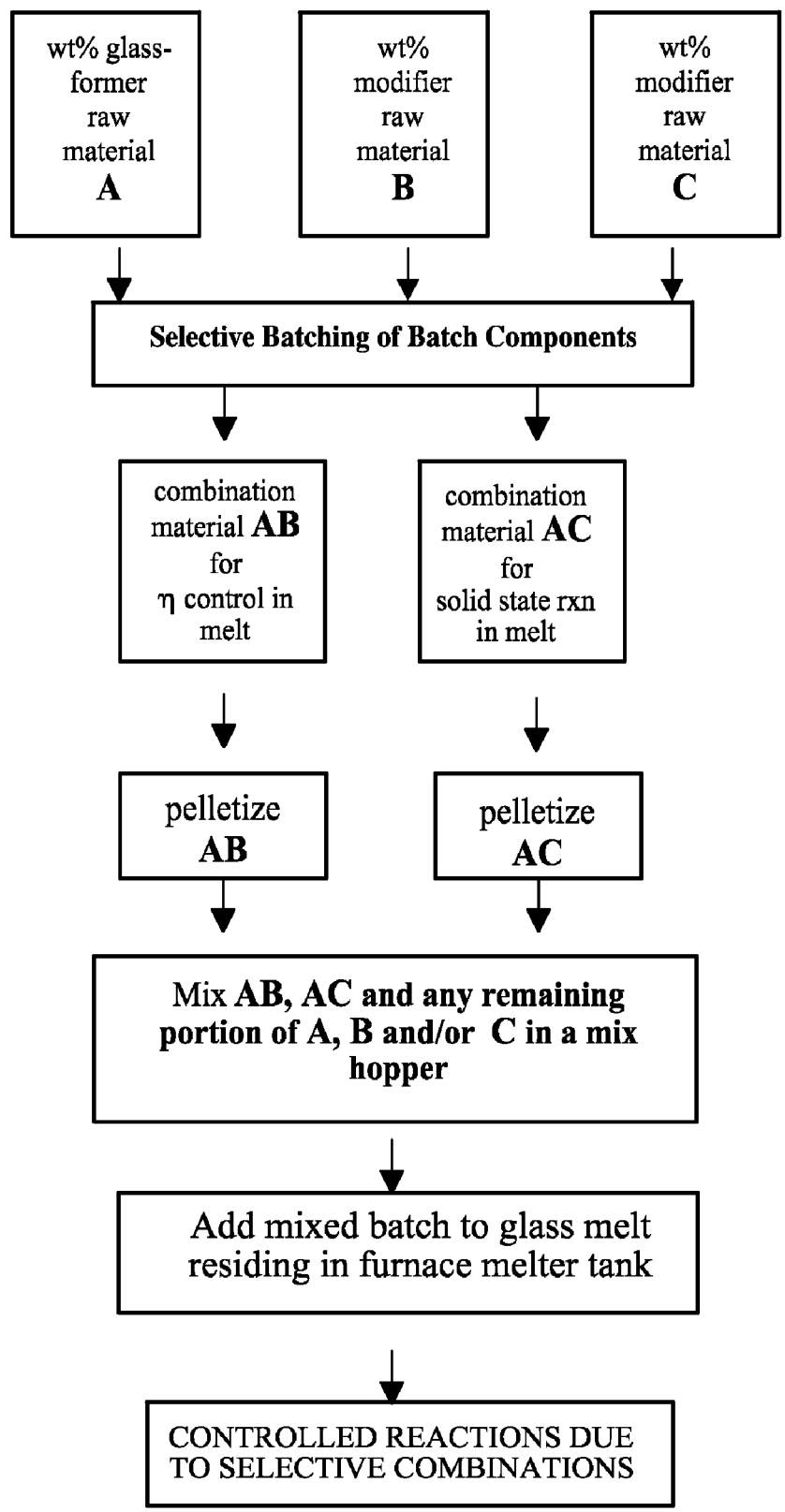
FIG. 4 is a flow diagram illustrating a first embodiment of the selective glass batching method according to the novel technology.

As shown in the flow diagram in FIG. 4, one embodiment of the novel technology is directed to narrowing the melting point range of the batch constituents by selectively combining a first portion of the batch components such that the selective combination exhibits the desired Theological properties (i.e., increased viscosity) in the molten phase formed during the narrowed melting point range. Additionally, a second portion of the batch components are selectively combined such that the selective combination has a specific reaction temperature range wherein an intermediate compound is formed via a physical and/or chemical reaction between the combination and the resident melt. The reaction temperature may be taken to be a specific temperature at which a chemical or physical reaction substantially begins to take place at a substantial rate, or may be a temperature range within which such reactions begin to occur within the batch components. Since the composition of the batch components may not be uniform, and in fact will vary as reactions producing at least one liquid product (at local temperatures and pressures) begin to occur, the temperature range within which the rate of such reactions becomes significant may be taken as the reaction temperature range. These reactions are not necessarily physical melting or phase change reactions, but may instead be other physical reactions, such as the formation of a suspension, and/or chemical reactions such as solid state chemical reactions, chemical reactions between solid and liquid reactants, chemical reactions producing at least one liquid product, incongruent decomposition of one or more materials, and the like.

Stabilizing the form of the new combination of selectively combined batch components can be accomplished in various ways which themselves have various levels of energy requirements. Examples include selectively batching and pelletizing to form small "reaction members" that react initially to form an intermediate reaction product; pre-reacting selective batch components to form an intermediate feedstock; and pre-melting selective batch components as an intermediate feedstock.

FIG. 4 shows that the batch recipe calls for a specified wt % of glass-former A, modifier B and modifier C. At least a portion of glass-former A and at least a portion of modifier B are selectively combined on a weight percent basis to form a first pre-batch mixture AB that will have a melting temperature $T_{AB}$ in a range of about 60 to 90% of the resident melt temperature $T_m$ and a viscosity $R_{AB} \geq$ the resident melt viscosity $R_m/100$. Preferably, $R_{AB}$ is in a range of 150 centipoise to 15,000 centipoise, although viscosities exceeding 15,000 centipoise are not outside the scope of the novel technology. The preferred viscosity $R_{AB}$ of the first pre-batch mixture can also be expressed as being at least 1% of $R_m$. It should be noted that the viscosities of the above-mentioned conventionally encountered low viscosity eutectic liquids that contribute to batch segregation (and are thus typically desired to be avoided) are considerably less than 1% of the viscosity of the resident melt. For example, the viscosity of the eutectic liquid formed by the reactions between $CaCO_3$ and $Na_2CO_3$ is approximately 0.03% of the viscosity of the resident melt.

It should also be noted that although $T_m$ is preferably expressed in terms of Kelvin (i.e., an absolute temperature scale), $T_m$ can also be expressed by other units for measuring temperature, for example, degrees Celsius (° C.). Although the different temperature scales can be compared to one another using common conversion factors, for purposes of establishing the relationship between the resident melt temperature and the temperature ranges over which the selectively combined batch components either melt or react according to the novel technology, the absolute temperature scale is preferred.

Similarly, at least another portion of glass-former A and at least a portion of modifier C are selectively combined on a weight percent basis to form a second pre-batch mixture AC that will have a reaction temperature $T_{AC}$ in a range of about 60-100% of the resident melt temperature $T_m$ such that melt homogenization and diffusion will occur via chemical reactions rather than by melting the second pre-batch mixture AC. Each of the first AB and second AC pre-batch mixtures are then pelletized.

Typically, the novel technology does not involve pelletizing as a batching step per se. Rather, pelletized batching techniques are simply one method useful to keep the selectively batched components together in the form of the respective pre-batch mixtures as they are introduced into the furnace. Although batch pelletizing is known in the art, typical pelletizing practices relate to pelletizing the entire batch, rather than selectively pelletizing portions of the batch in specific compositional ratios in order to control the melting reactions in the tank.

Pelletized AB, pelletized AC, and any remaining portions of A, B and/or C are then mixed such as in a mix hopper and then added to a melter. AB and AC may also be pre-reacted or pre-melted. Controlled reactions occur in the melter at various temperatures between the selectively combined batch raw material components AB and AC and the resident melt, until a substantially homogenous melt is eventually achieved. Although the traditional uncontrolled reactions may still occur on a limited level between the portions of the batch components A, B and C that were not selectively combined, these reactions are proportionally reduced and minimized and do not significantly reduce the improved melting efficiency by forming significant amount of segregating low viscosity phases within the melt.

Figure 5:
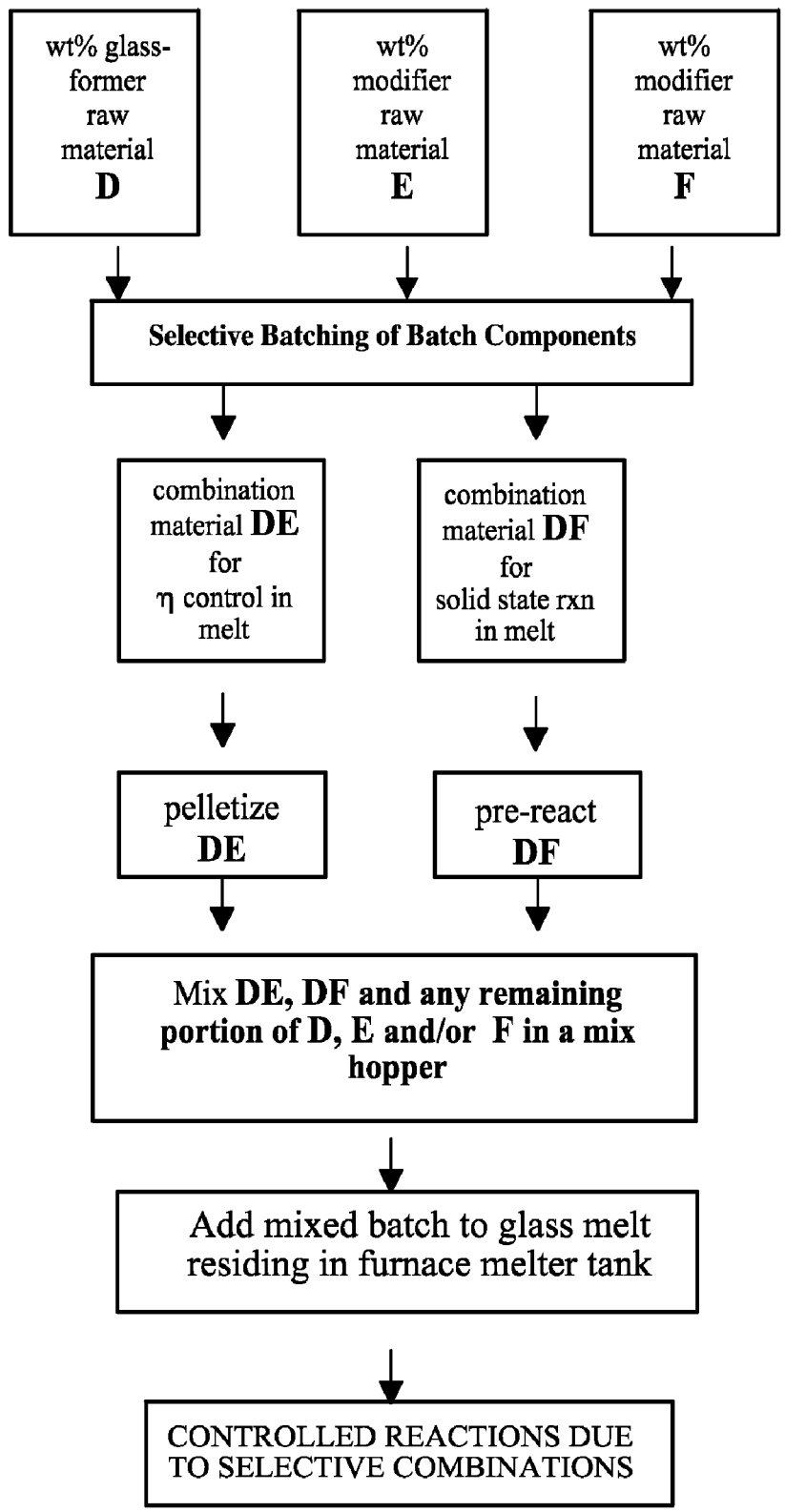
FIG. 5 is a flow diagram illustrating a second embodiment of the selective glass batching method according to the novel technology.

As shown in the flow diagram in FIG. 5, another embodiment of the novel technology is directed to narrowing the melting point range of the batch constituents by selectively combining a first portion of the batch components such that the selective combination exhibits the desired rheological properties (such as increased viscosity) in the molten phase formed during the narrowed melting point range. Additionally, a second portion of the batch components are selectively combined such that the selective combination also exhibits the desired rheological properties (such as increased viscosity) in the molten phase formed during the narrowed melting point range.

FIG. 5 shows that the batch recipe calls for a specified weight percent of glass-former D, modifier E and modifier F. At least a portion of glass-former D and at least a portion of modifier E are selectively combined on a weight percent basis to form a first pre-batch mixture DE that will have a melting temperature $T_{DE}$ in a range of between about 60% and about 90% of the resident melt temperature $T_m$ and a viscosity $\eta_{DE} \geq$ the resident melt viscosity $\eta_m$. Similarly, at least another portion of glass-former D and at least a portion of modifier F are selectively combined on a weight percent basis to form a second pre-batch mixture DF that will have a melting temperature $T_{DE}$ in a range of between about 60% and about 90% of the resident melt temperature $T_m$ and a viscosity $\eta_{DF} \geq$ the resident melt viscosity $T_m$. The first pre-batch mixture DE is typically pelletized, as described above, and the second pre-batch mixture DF is typically pre-reacted.

Pre-reacting the selectively combined batch components typically involves heating the selected components to a temperature proximate a reaction temperature to form an intermediate reaction product. This reaction temperature and the intermediate reaction product so-formed will vary depending upon the batch components selected and the proportions chosen. The reaction temperature may be a specific temperature at which a chemical or physical reaction substantially begins to take place at a substantial rate, or may be a range at which such reactions begin to occur within the batch components, as the composition of the batch components may not be locally uniform, and in fact will vary as reactions having at least one liquid component (at local temperatures and pressures) begin to occur. The reaction product is typically then cooled and ground into a particulate form, which may then be further processed (i.e., pelletized as described above) or added to the batch mixture in particulate form. Controlling the particle size distribution, such as by minimizing the particle size of the selectively combined particulate intermediate material, further improves the melting efficiency by increasing the effective surface area available to contribute to the melting reactions when introduced into the melter. That is, since the particulate material disperse and react with greater speed and homogeneity than traditional coarse grain batch component raw materials, melting efficiency can be improved and any segregation can be further prevented when the particulates are selectively combined according to the novel technology.

Pelletized DE, pre-reacted particulate DF and any remaining portions of D, E and/or F are then mixed, such as in a mix hopper, and added to the melter. It should also be noted that DE and DF may also be pre-melted. Controlled reactions occur in the melter at various temperatures between the selectively combined batch raw material components DE, DF and the resident melt, until a substantially homogenous melt is eventually achieved. Although the traditional uncontrolled reactions may still occur on a limited level between the portions of the batch components D, E and F that were not selectively combined, these reactions are proportionally reduced and typically do not significantly impact the benefits of improved melting efficiency associated with the novel technology or contribute to forming low viscosity phases within the melt.

Although the novel technology is applicable to any glass batch composition, a specific examples relating to a various glass compositions are described herein below.

Figure 6:
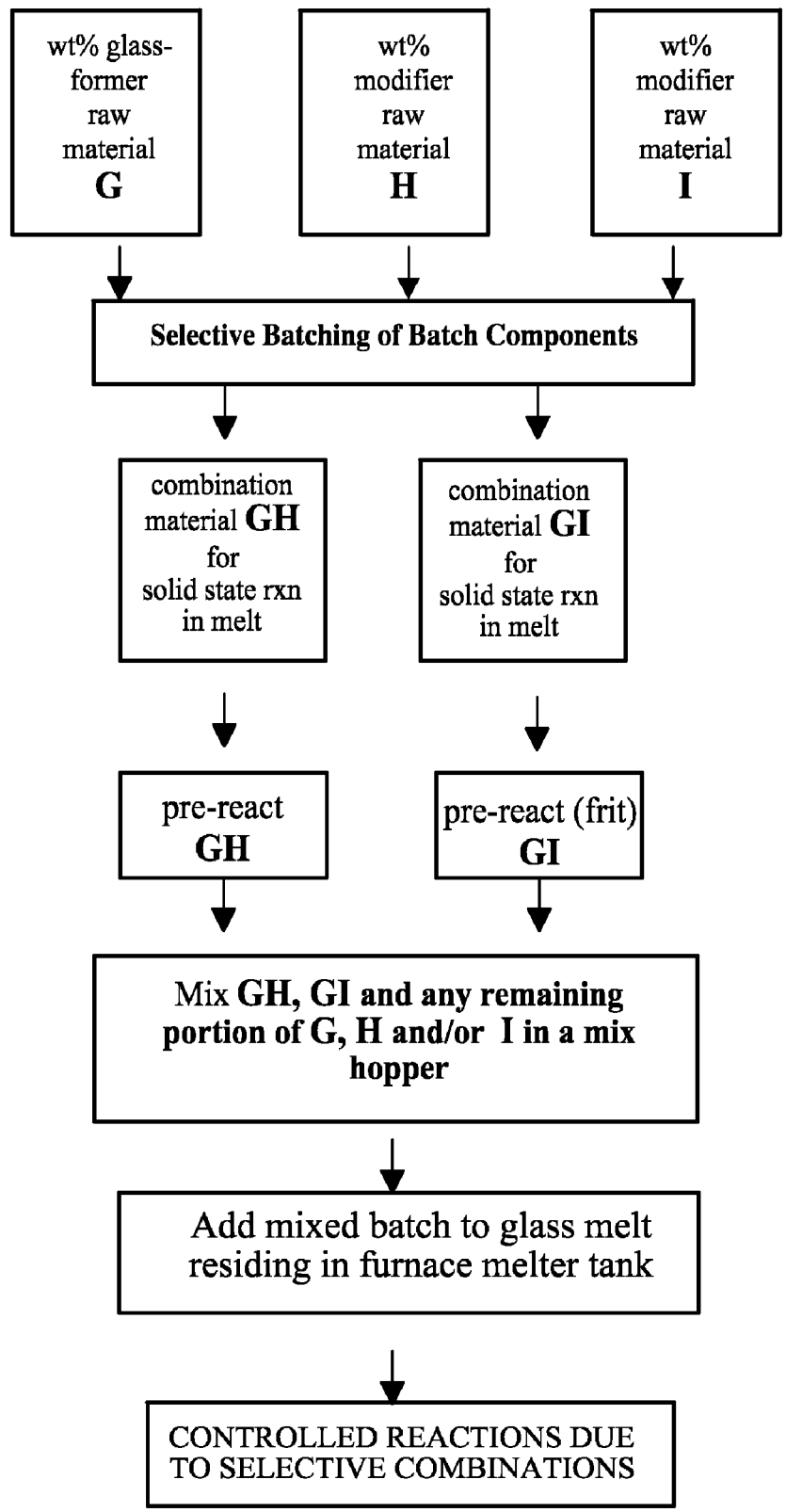
FIG. 6 is a flow diagram illustrating a third embodiment of the selective glass batching method according to the novel technology.

As shown in the flow diagram in FIG. 6, another embodiment of the novel technology is directed to selectively combining a portion of the raw material batch components such that the selective combinations have a specific reaction temperature range wherein an intermediate compound is formed via a chemical reaction between the combination and the resident melt. FIG. 6 shows that the batch recipe calls for a specified weight of glass-former G, modifier H and modifier I. At least a portion of glass-former G and at least a portion of modifier H are selectively combined on a weight percent basis to form a first pre-batch mixture GH will have a reaction temperature $T_{GH}$ in a range of from about 60% to 100% of the resident melt temperature $T_m$ such that melt homogenization will occur via chemical reactions rather than by melting the second pre-batch mixture GH. Similarly, at least another portion of glass-former G and at least a portion of modifier I are selectively combined on a weight percent basis to form a second pre-batch mixture GI that will have a reaction temperature $T_{GI}$ in a range of between about 60% to 100% of the resident melt temperature $T_m$ such that melt homogenization will typically occur via chemical reactions rather than by melting the second pre-batch mixture GI. The first pre-batch mixture GH is typically pre-reacted, as described above, and the second pre-batch mixture GI is typically pre-melted into a frit.

Pre-melting the selective combinations involves heating the selected batch components to a temperature proximate the melting temperature of the system, allowing time for homogenization, and then quenching the melted pre-batch mixture to form a frit having the composition based on the selected combination.

Pre-reacted particulate GH, pre-melted frit GI and any remaining portions of G, H and/or I are then mixed, for example, in a mix hopper, and then added to the melter. It should also be noted that GH and GI may also be pelletized. Controlled chemical reactions occur in the melter at various temperatures between the selectively combined batch raw material components GH, GI and the resident melt, until a substantially homogenous melt is eventually achieved. Although the traditional uncontrolled reactions may still occur on a limited level between the portions of the batch components G, H and I that were not selectively combined, these reactions are substantially reduced and do not significantly detract from the improved melting efficiency or substantially contribute to segregation of the batch by forming low viscosity phases within the melt.

It should also be noted that the raw materials from which the batch components are selected can be oxides, carbonates, hydroxides, chlorides, sulfates, nitrates, or mixed industrial minerals such as feldspars or clays or the like. In order to reduce the potential for harmful byproduct emissions, however, it is desired that the intermediate products formed by the selectively pre-batched combinations do not produce gasses such as $SO_x$ and $NO_x$ as a result of the melting and fining process.

Example

Figure 8:
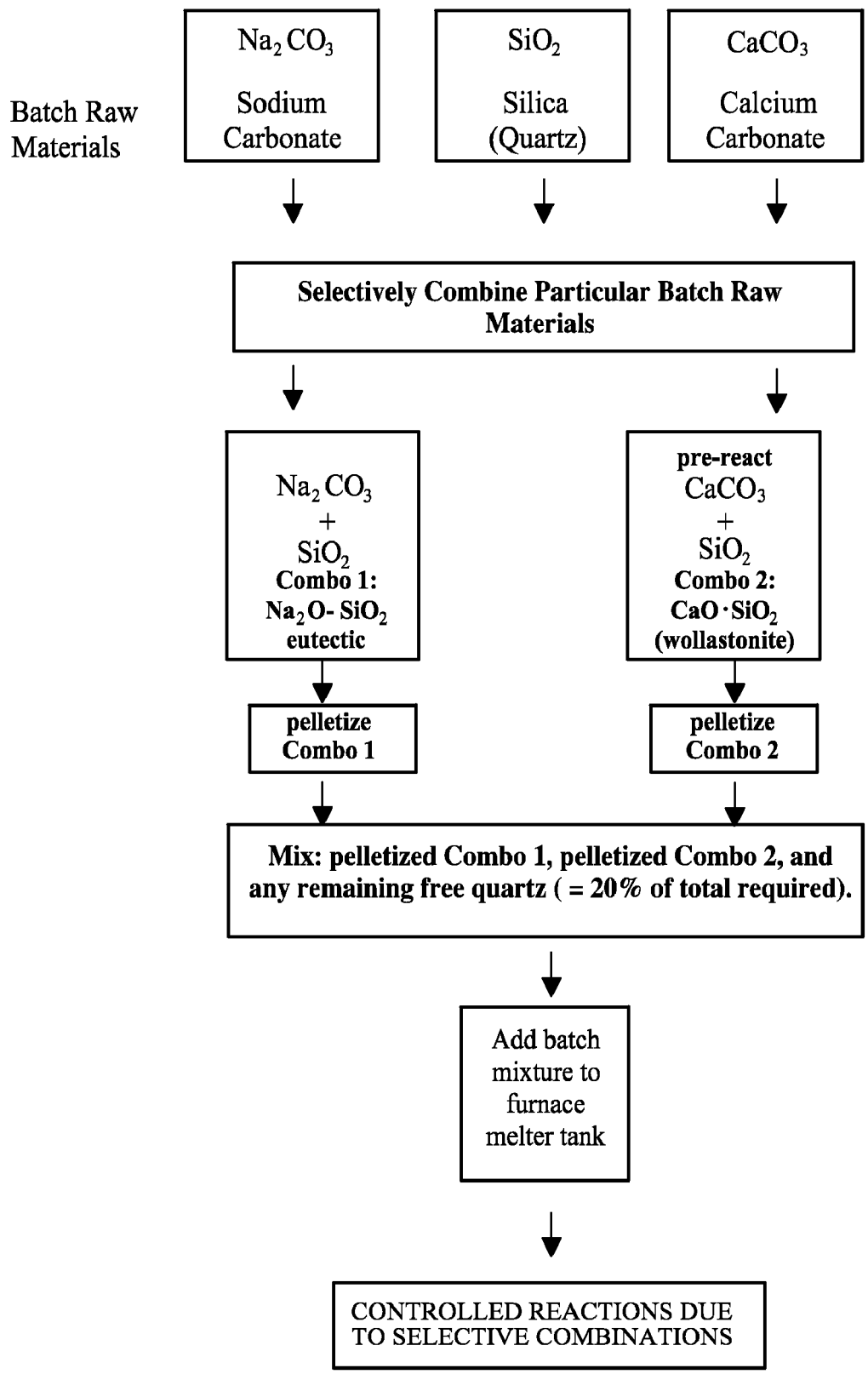
FIG. 8 is a flow diagram illustrating the selective batching method according to the example.

The following example is particularly directed to a float glass composition and melting scenario. FIG. 8 is a flow diagram illustrating the selective batching method according to the example. Traditional batch components of $Na_2CO_3$, $CaCO_3$, and $SiO_2$ are provided. Instead of simply mixing all of these raw material components together, however, specific combinations of these raw materials are selectively pre-batched.

That is, $Na_2CO_3$ is selectively batched with quartz in the eutectic proportions of the $Na_2O$—$SiO_2$ system to provide a first pre-batch mixture to minimize the possibility of low viscosity liquid formation by preventing the eutectic reaction of $Na_2CO_3$ with other raw materials (such as $CaCO_3$) that ordinarily occurs absent the selective batching according to the novel technology. $CaCO_3$ is selectively combined and pre-reacted with quartz to form a second pre-batch mixture (i.e., an intermediate reaction product). In this case, the second pre-batch mixture is wollastonite (CaO $SiO_2$), which will not melt after being mixed with the first pre-batch mixture and remaining batch components (e.g., free quartz) and being introduced into the melt. Instead, the wollastonite interacts with the melt and the other batch components via a solid-state reaction.

Figure 7:
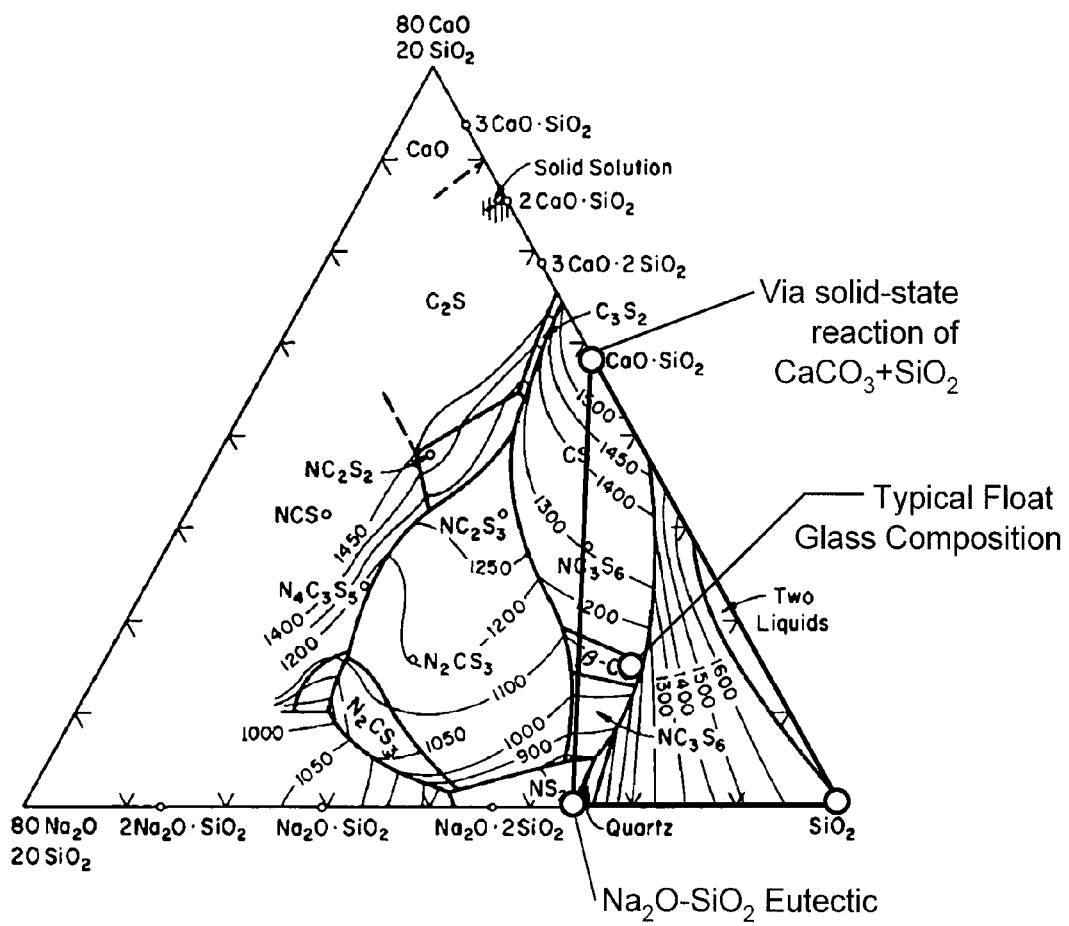
FIG. 7 is a is a ternary phase diagram of a selectively combined glass batch sub-system according to the example based on a commercial float glass composition.

These first and second pre-batch mixtures are each pelletized and mixed with the remaining amount of quartz (approximately less than 20% of the total batch) prior to being introduced into the melt and beginning the melting process. As shown in the phase diagram in FIG. 7, the reaction sequence during the melting process is altered to prevent gross segregation of the batch components, and intermediate reaction products (e.g., the $Na_2O$—$SiO_2$ eutectic and synthetic wollastonite) are created. That is, $SiO_2$, the $Na_2O$—$SiO_2$ eutectic and synthetic wollastonite ($CaO.SiO_2$) comprise a sub-system and the amount of free quartz which is not selectively combined with another material is reduced to less than 20%. Thus, reducing the amount of silica added to the glass furnace as quartz, or adding a majority of the quartz intimately mixed with a more reactive species, improves melting efficiency and also reduces the tendency for the above-described segregation problem.

That is, the melting point of the $Na_2O$—$SiO_2$ eutectic is 785° C. (1058 K), which is within a range of 60-90% of the overall temperature of the resident melt (on the order of 1400° C. or 1673 K). The viscosity of the $Na_2O$—$SiO_2$ eutectic is on the order of 1000 mPa·s (1000 centipoise), which is approximately 7% of the viscosity of the resident melt. Since wollastonite has a melting point of 1550° C., wollastonite will not melt per se, even at a resident melt temperature on the order of 1400° C. Instead, the batch is homogenized within the melt via chemical reactions at temperatures within 60-100% of the resident melt temperature, improving melting efficiency and substantially preventing the formation of low viscosity liquidus phases that promote batch segregation. It should be noted, however, that the temperatures within the glass tank exceed the temperature of the resident melt. For example, it is not uncommon for glass tank temperatures to range from 1300° C. to 1500° C. for a glass with a melting point of 1100° C. Certain glass compositions, such as E-glasses, have higher melting points (such as 1400° C. to 1500° C. for E-glasses); accordingly, the furnace temperatures for melting these glasses is typically somewhat higher.

It should also be noted that the second pre-batch mixture according to the example could also be selectively combined and pelletized without actually pre-reacting and thus not forming wollastonite until the reaction temperature range is reached within the melt. At that time, instead of melting, the chemical reaction forming wollastonite occurs and the solid state interactions with the melt follow, while the tendency for a low viscosity liquid is still reduced.

As shown and described above, since the pre-batch mixtures (and intermediate reaction products) react more easily in specified sub-systems than traditional raw material batch components react in a traditional system, the overall energy needs and time required to form a homogeneous melt are significantly reduced. Diffusion distances are kept short, substantially reducing the time required for melting and homogenization, substantially reducing fining times and reducing the tendency for large scale segregation. Alternatively, due to the reduced reaction time, additional fining time could be provided in the current furnace setup (assuming a constant residence time is maintained), which further eliminates the potential for seeds and further improves the overall homogeneity of the melt to, yield higher quality glass products.

While the novel technology is useful for improving melting efficiency by reducing the tendency for batch component raw materials to segregate within the melt, the methodology and benefits of the novel technology are equally applicable for glass systems that are not necessarily subject to gross segregation problems. That is, selectively combining batch components according to the novel technology enables improved melting efficiency, material efficiency and fuel efficiency as described above, even in the absence of gross segregation.

Borosilicate Glass Compositions

TABLE 1

Compositional Range for Types of Borsilicate Glasses

| Type | $B_2O_3$ wt. % | $SiO_2$ wt. % | $Al_2O_3$ wt. % | CaO wt. % | MgO wt. % | $Na_2O$ wt. % | $K_2O$ wt. % |
|---|---|---|---|---|---|---|---|
| E-glass | 5-10 | 52-57 | 12-16 | 16-25 | 0-5 | 0.5-1.0 | 0-0.5 |
| Low expansion borosilicate | 10-13 | 80-81 | 2-3 | 0-1 | 0-1 | 3-4 | 0-1 |
| Glass wool | 3-10 | 50-65 | 3-5 | 8-16 | 3-5 | 10-16 | 0-1 |
| Labware | 10-13 | 68-70 | 5-7 | 0-1 | 0-1 | 7-9 | 0-2 |
| Aluminoborosilicate | 9-10 | 74-76 | 5-6 | 0-2 | 0-1 | 5-7 | 0-1 |
| Low electrical loss | 27-30 | 69-72 | 0-2 | 0-1 | 0-1 | 0-1 | 0-1 |
| Specific Examples |  |  |  |  |  |  |  |
| Corning Pyrex 7740 | 13.0 | 80.6 | 2.3 |  |  | 4.0 | 0.1 |

TABLE 2

Raw Materials for Boron Additions

| | Formula |
|---|---|
| Natural Minerals | |
| Colemanite | $Ca_2B_6O_{11} \cdot 5H_2O$ |
| Kernite | $Na_2B_4O_7 \cdot 4H_2O$ |
| Tincal (natural borax) | $Na_2B_4O_7 \cdot 10H_2O$ |
| Ulexite | $NaCaB_5O_9 \cdot 8H_2O$ |
| Datolite | $CaBSiO_4(OH)$ |
| Refined Materials | |
| Anhydrous borax | $Na_2B_4O_7$ |
| Borax decahydrate | $Na_2B_4O_7 \cdot 10H_2O$ |
| Borax pentahydrate | $Na_2B_4O_7 \cdot 5H_2O$ |
| Boric acid | $H_3BO_3$ |
| Boric oxide | $B_2O_3$ |

In another embodiment, the novel technology relates to improved compositions and methods for preparing boron-containing glass melts and, in particular, glass melts utilizing raw materials which contain boron, calcium, alumina and silica, the four primary components of E-glass. According to the novel technology, these four components may be formulated into two separate batches and then combined prior to their introduction to the furnace and melted. The first batch includes silica-, calcium- and boron-containing raw materials and is consolidated into granules before entering the melting process. The second pre-batch includes silica-, calcium- and alumina-containing raw materials. The second batch may be added as a plurality of raw materials or preferably can also be consolidated into granules before entering the melting process. Small particle size raw materials are typically chosen. Consolidation of the first batch, and optionally the second batch, into granules is carried out by suitable methods such as by spray drying, pan granulation, or compaction, briquetting, or pelletization.

Figure 10:
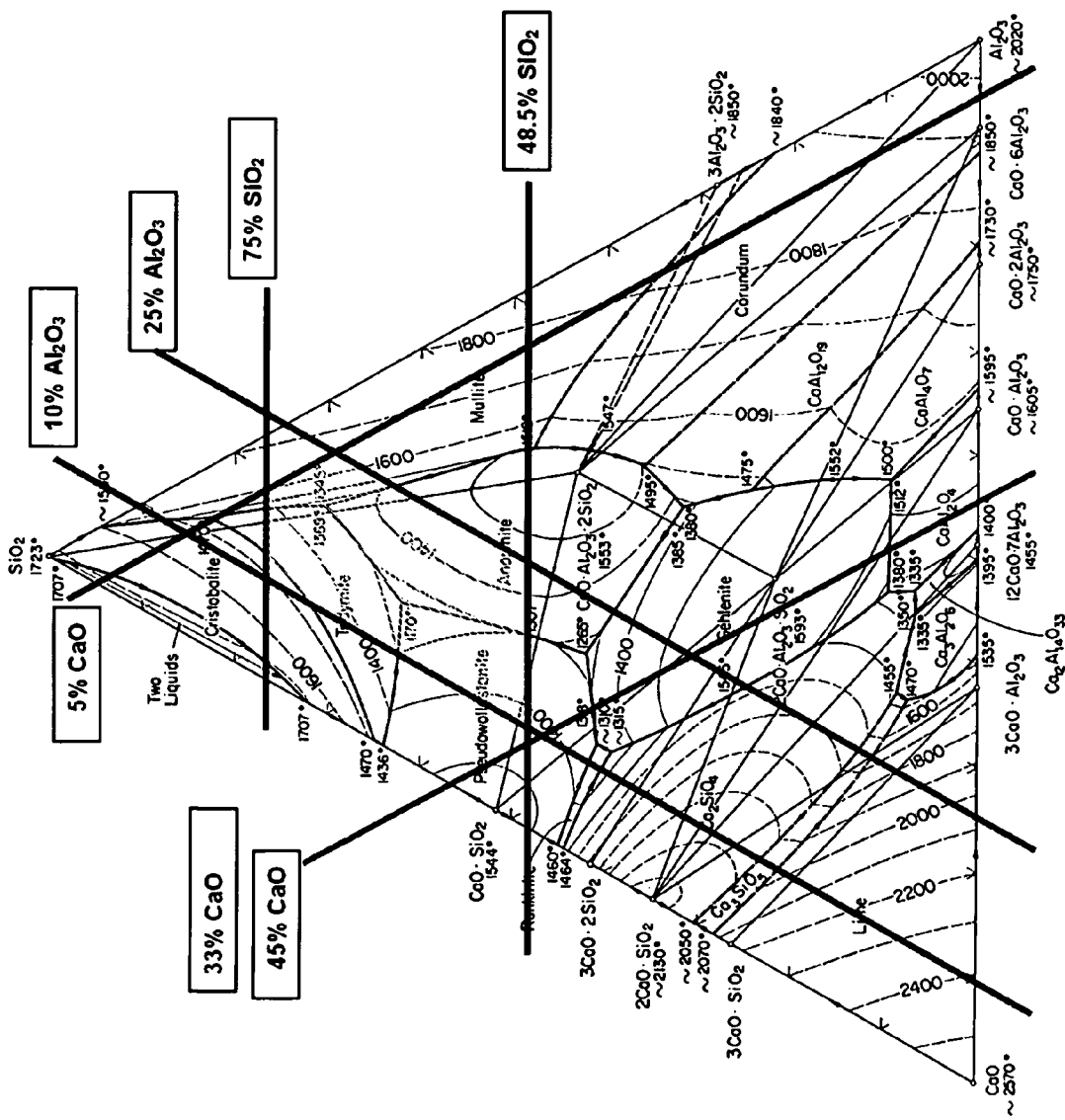
FIG. 10 shows the $SiO_2$—$CaO$—$Al_2O_3$ phase diagram. Typical compositions according to the novel technology are shown by the dark shaded area.

The composition of the first pre-batch is typically formulated using the $CaO$—$B_2O_3$—$SiO_2$ phase diagram (FIG. 1). The composition of the second pre-batch is defined on the $CaO$—$Al_2O_3$—$SiO_2$ phase diagram (FIG. 10). Individual first and second pre-batch compositions are typically formulated so that both have low melting temperature ($T_m$) and there is a minimal difference in melting temperatures ($\Delta T_m$) between the two batches. This low $\Delta T_m$ condition helps reduce segregation within the batch during melting. The first and second pre-batches are typically formulated to have melting temperatures of less than 1300° C. for E-glass systems. Typically the $\Delta T_m$ is less than about 200° C. In addition the composition of the first pre-batch and the second pre-batch must be chosen such that a combination of the two pre-batches will provide a batch having the desired E-glass melt composition. More typically, the final glass melt does not contain an excessively large amount of either pre-batch relative to the other. Typically, at a weight ratio of between about 1:15 and 15:1 is maintained; more typically, a weight ratio of between about 1:10 and 10:1 is maintained; still more typically, a weight ratio of between about 1:5 and 5:1 is maintained.

Figure 9:
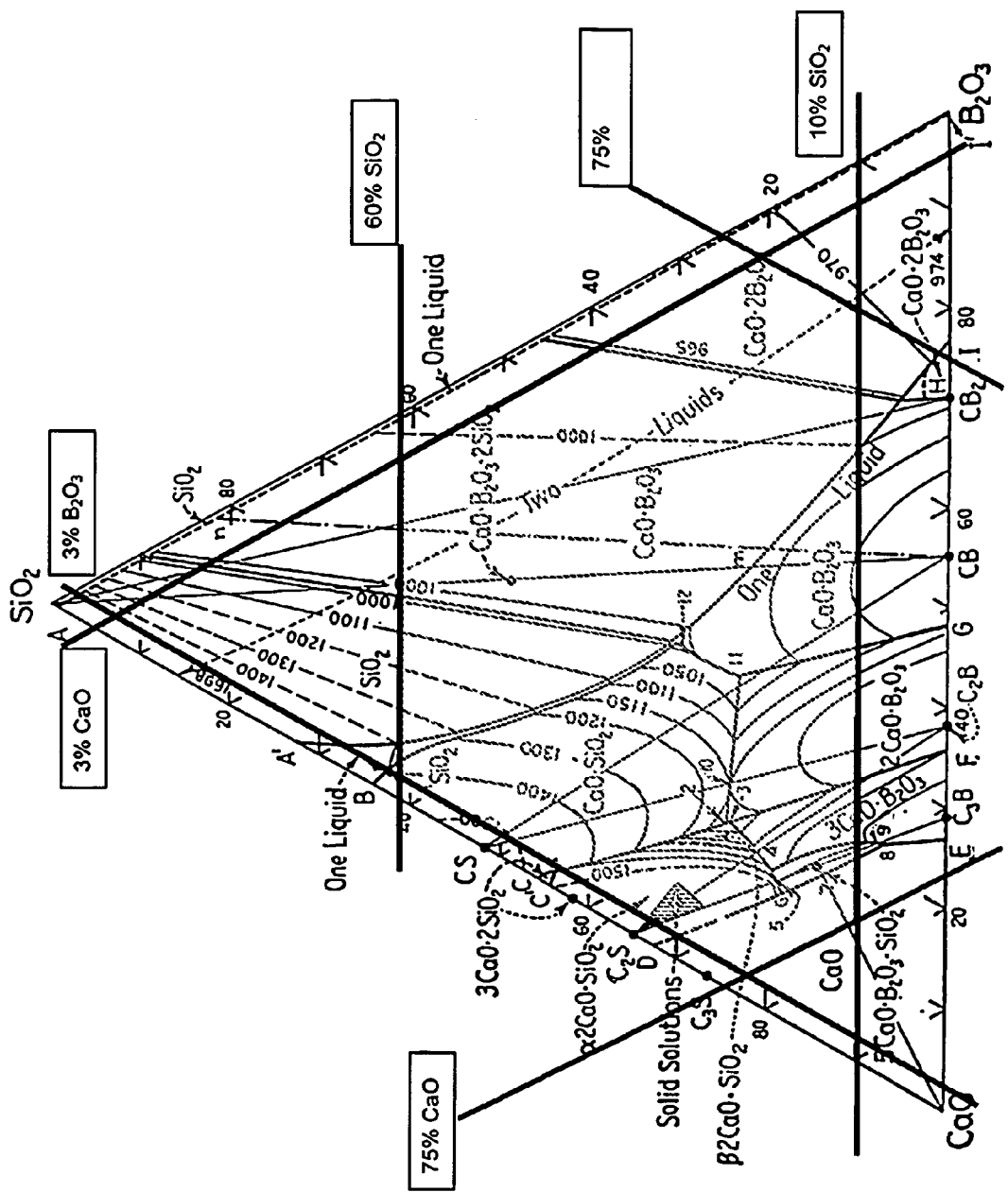
FIG. 9 shows the $SiO_2$—$CaO$—$B_2O_3$ phase diagram. Typical compositions according to the novel technology are shown by the light colored area.

The typical composition range for the first pre-batch is illustrated on the $CaO$—$B_2O_3$—$SiO_2$ phase diagram in FIG. 9. An acceptable melting temperature region is bounded by the 1300° C. isotherm of in the $CaO$—$B_2O_3$—$SiO_2$ phase diagram and the low melting eutectic which occurs at a composition of about 45% by weight CaO (typically added as $CaCO_3$), 32% by weight $B_2O_3$ and 23% by weight $SiO_2$. This eutectic composition has a melting point of about 975° C. The composition cutoffs are chosen so that the pre-batch compositions are not pushed towards any extremes in composition, in order that the resulting composition of the second pre-batch (needed to achieve the desired final batch composition) will also reside within a favorable temperature region. Typically, the first pre-batch composition is within a range of about 10-40% by weight $B_2O_3$, about 30-60% by weight CaO, and about 15-60% by weight $SiO_2$ (with B, Ca and Si presented as the relevant oxides). This composition range is illustrated by the light shaded region in FIG. 10.

The combination of calcium with boron in the first pre-batch granules promotes reaction between these two components in order to tie up boron and prevent it from mobilizing as a low viscosity liquid and segregating away from the other batch constituents, thereby making it more difficult to melt the more refractory components, such as silica. The reaction between calcium and boron also inhibits the loss of volatile boric oxide from the melt. The combined boron and calcium melt thus promotes melting of silica at lower temperatures.

The preferred composition of the second pre-batch is illustrated by the dark shaded region in the $CaO—Al_2O_3—SiO_2$ phase diagram shown in FIG. 10. This region surrounds the low melting eutectic between the anorthite, pseudowollastonite, and tridymite phase fields, having a melting point of about 1170° C. The second batch typically is formulated to contain in the range of about 10-18.5% by weight $Al_2O_3$, about 49.5-66.5% by weight $SiO_2$, and less than about 33% by weight CaO (with Al, Ca and Si presented as the relevant oxides). More typically, the second batch contains in the range of about 10-20% by weight $Al_2O_3$, about 48.5-68.5% by weight $SiO_2$, and less than about 33% by weight CaO (with Al, Ca and Si presented as the relevant oxides). The eutectic point between the gehlinite, pseudowollastonite and anorthite phase fields having a melting point of 1265° C. is not typically selected due to its higher melting temperature and higher CaO content.

The first and second pre-batch compositions may also contain minor amounts of other suitable glass making materials. For example, the first pre-batch may contain a minor amount of alumina and the second batch may contain a minor amount of boron, provided that the basic character of these compositions, as described above and in the phase diagrams, is maintained. In particular, the presence of a minor amount of boron in the second ($CaO—Al_2O_3—SiO_2$) batch may be beneficial to the overall melt formation by facilitating the dissolution and melting of the more refractory components. Furthermore, MgO, SrO, BaO and ZnO can substitute for CaO. Other minor components which may be added include $Li_2O$, $Na_2O$, $K_2O$, PbO, and FeO.

According to the methods of the novel technology, glass melts are prepared by combining the first pre-batch granules, including silica-, calcium- and boron-containing raw materials, with the second pre-batch, comprising consolidated granules or a plurality of raw materials, and including silica-, calcium- and alumina-containing raw materials, and heating the resulting glass batch such that the glass batch materials are melted.

Suitable raw materials for use in the compositions and methods of the novel technology include any raw materials which are suitable to such glass making applications, including natural or mineral-based products and synthetic or byproduct chemical-based raw materials. Suitable silica-containing raw materials may include quartz sands, clays, feldspar, nepheline syenite, wollastonite, kyanite (provided the appropriate chemical adjustments are made for accompanying oxides). Suitable calcium-containing raw materials may include limestone, dolomite, synthetic calcium carbonates, and wollastonite. Suitable aluminum-containing raw materials may include alumina-bearing clays such as kaolin pyrophyllite, sericite, and kyanite and alumina chemicals such as calcined alumina (aluminum oxide), hydrated aluminas (such as aluminum hydrate, beohmite, and pseudo-beohmite) and the like. Suitable boron-containing raw materials may include borate chemicals, such as boric acid, boric oxide, and borate salts such as sodium, potassium, zinc, and calcium borates, as well as natural borates such as colemanite, ulexite, and the like.

Small mean particle size raw materials are typically used in order to promote rapid melting. However, fine particle sizes may give rise to dust problems and agglomeration of refractory raw materials that can make them harder to melt. Consolidation of the first pre-batch, and optionally the second pre-batch, into discrete reaction members (granules) provides intimate contact and short diffusion distances between fluxing compounds and more refractory materials, and also eliminates dusting and agglomeration problems. Typically, the particle size of the raw materials is less than or equal to 150 μm, although larger particle size materials will still work. The granule size is typically from 100 μm to 5.0 mm, and is more typically from 200 μm to 2.0 mm. The melting benefit has not been observed to be significantly affected by the granule size.

Low melting point materials typically form a liquid that gives rise to capillary forces within the consolidated granules that serve to inhibit segregation of low melting components away from the more refractory components within the granules. Consolidation may be achieved by spray drying an aqueous slurry of the raw material batch components to form spray dried granules. Alternatively, consolidation into discrete granules may be carried out by other suitable means, such as pan granulation or compaction by such methods as briquetting, roll compacting or extruding. Granule strength and fluxing characteristics may be enhanced by allowing boron to dissolve in aqueous media and then redeposit in the interstices between particles in a consolidated granule. For example, a soluble source of boron, such as boric acid, may be dissolved in the aqueous slurry media prior to spray drying. When the slurry is spray dried, the boron is then deposited in the interstices between raw material particles in the granules formed during spray drying. In the dry granulation case, the water used to provide cohesion may be present in the form of a boric acid solution, thus ensuring a more homogeneous distribution of boron in the granule further assisting the melting process.

Another embodiment of the novel technology involves layered granules in which one pre-batch, e.g. the first ($CaO—B_2O_3—SiO_2$) pre-batch forms the core of the granules and the other batch, e.g., the second ($CaO—Al_2O_3—SiO_2$) pre-batch forms an outer layer of the granules, surrounding the inner core. This approach affects the advantage of not requiring a subsequent mixing step to blend the granules prior to their introduction to the furnace for melting.

The compositions of the first and second pre-batches are typically selected so that the desired final glass composition can be obtained without requiring excessive amounts of either the first or second pre-batch. Typically, the weight ratio of the first pre-batch to the second pre-batch is in the range of about 5:1 to about 1:5, although the weight ratio may be between about 10:1 and about 1:10 or even between about 1:15 and 15:1.

This novel technology provides a number of potential improvements to glass manufacturing processes. The temperature requirements in glass melting furnaces may be reduced by driving the melting reactions toward low melting eutectics. Furthermore, the melting time may be reduced by as much as 50%. In addition volatile losses of boron may be reached by less volatile intermediates, as well as by the effect of reduced temperature and melt residence times. The reduced time and residence melt temperatures may likewise significantly reduce energy use. More rapid melting may also increase the production capacity of existing melting plants and lower process temperatures may increase the useful life cycle of existing kilns, all contributors to a substantial net cost savings.

EXAMPLES

The following examples illustrate the compositions and methods of this novel technology.

Melt Test Procedures

A series of glass melt tests were carried out to demonstrate the methods and compositions of the novel technology. Each test was designed to produce a melt having the following final composition, corresponding to a typical E-glass: 55.5% by weight $SiO_2$, 24.0% by weight CaO, 14.3% by weight $Al_2O_3$ and 6.2% by weight $B_2O_3$. The raw material powders used in these tests are described in Table 3.

TABLE 3

Raw Materials

| Raw Materials | Mean Particle Size (μm) | Primary Chemical Constituents | Wt. % used in melt tests |
|---|---|---|---|
| Flint (silica) from Oglebay Norton | 12.4 | 98.52% $SiO_2$ | 28.48 |
| MD CARB 18 Whiting (calcium carbonate) from Southdown | 17.6 | 56.03% CaO 43.97% $CO_2$ | 32.72 |
| EPK kaolin clay from Zemex Industrial Minerals | 4.8 | 30.55% $Al_2O_3$ 47.4% $SiO_2$ 12.5% $H_2O$ | 30.55 |
| OPTIBOR ® SQ orthoboric acid from U.S. Borax Inc. | 45.3 | 57.65% $B_2O_3$ 42.35% $H_2O$ | 8.25 |

In all melting tests the combined raw material powders for each batch were consolidated into granules by spray drying as follows. The prescribed amounts of raw materials for the batch were combined and slurried in an aqueous suspension containing 25 volume percent of the raw material solids. The suspensions were spray dried in a Bowen Engineering BE 985 laboratory spray drier, operating at an inlet temperature of 350° C., an outlet temperature of 150° C. and an atomizing air pressure of 17 psi.

Twenty-five (25) grams of the spray dried materials were weighed into each of typically eight (depending on the experiment) 75 ml crucibles and then placed in a kiln at 1300° C. One crucible was removed from the kiln every 30 minutes and allowed to cool and solidify to form a glassy solid. The cooled glasses were evaluated visually to determine at what point in time all of the initial spray dried batch solids were completely melted (the "batch-free time"). The visual determination was verified by optical microscopy at a magnification of 10×. The batch-free time was defined as the midpoint in time (±15 minutes) between the last sample to contain some unmelted batch material and the first sample to be completely "batch-free".

Example 1

Single Batch Melt Test (Comparative)

A melt test was carried out on a single batch for comparison against subsequent selective batch tests. This batch contained the typical E-glass composition (55.5% by weight $SiO_2$, 24.0% by weight CaO, 14.3% by weight $Al_2O_3$ and 6.2% by weight B2O3). The batch was spray dried and the melt test was conducted according to the procedures described above. The batch-free time for this test was determined to be 2.8±0.3 hours.

Example 2

Selective Batch Melt Tests

Glass melt tests were conducted as in Example 1, except that the raw materials for each melt test were consolidated into granules as two separate pre-batches having different compositions from each other: a first pre-batch (including CaO—$B_2O_3$—$SiO_2$-containing raw materials) and a second pre-batch (including CaO—$Al_2O_3$—$SiO_2$-containing raw materials). The two pre-batches were formulated as described in Table 4. The first and second pre-batches for each melt test were respectively spray dried as described above to form first and second sets of granules for the test. These respective granule sets were combined in the weight ratio shown in Table 4, to provide the same overall composition as in Example 1. The first and second pre-batches of granules were combined and mixed by hand for 5 minutes prior to starting each melting test. The composition of the first and second granules are shown in Table 4. The melting test was then run on the mixed batch using the same procedures as in Example 1. The batch-free time for each melting test is given in Table 5

TABLE 4

| Test No. | Batch | Weight Percent | | | | Weight Ratio First Batch:Second Batch |
|---|---|---|---|---|---|---|
| | | $SiO_2$ | $Al_2O_3$ | CaO | $B_2O_3$ | |
| 0 | Single | 55.5 | 14.3 | 24.0 | 6.2 | Single Batch |
| 1 | First | 30.20 | 0 | 38.30 | 31.50 | 1:3.31 |
| | Second | 61.70 | 17.80 | 20.50 | 0 | |
| 2 | First | 17.50 | 0 | 52.50 | 30.00 | 1:2.86 |
| | Second | 65.40 | 18.00 | 16.60 | 0 | |
| 3 | First | 23.98 | 0 | 71.95 | 4.07 | 1:4.41 |
| | Second | 61.10 | 16.83 | 15.48 | 6.59 | |
| 4 | First | 23.98 | 0 | 71.95 | 4.07 | 1:4.41 |
| | Second | 61.10 | 16.83 | 15.48 | 6.59 | |
| 5 | First | 20.00 | 0 | 50.00 | 30.00 | 1:2.91 |
| | Second | 64.70 | 18.00 | 17.30 | 0 | |
| 6 | First | 30.00 | 0 | 60.00 | 10.00 | 1:3.22 |
| | Second | 61.87 | 17.88 | 15.00 | 5.25 | |
| 7 | First | 55.87 | 15.12 | 23.03 | 5.98 | 1:4.02 |
| | Second | 55.24 | 14.24 | 24.28 | 6.24 | |
| 8 | First | 7.80 | 0 | 69.40 | 22.80 | 1:1.80 |
| | Second | 73.30 | 19.60 | 7.10 | 0 | |
| 9 | First | 85.52 | 0 | 0 | 14.48 | 1:1.72 |
| | Second | 33.12 | 24.80 | 42.08 | 0 | |

Description of melting test conditions:
1. In selective batch test No. 1 the composition of the first batch was chosen to match the CaO—$B_2O_3$—$SiO_2$ eutectic composition having a melting point of about 975° C.
2. In selective batch test No. 2 the batch compositions were formulated so that the two batches would exhibit similar melting points.
3. In selective batch test No. 3 boric acid was included in the second ($Al_2O_3$-containing) batch in addition to the first batch.
4. The batch compositions in selective batch Test No. 4 are the same as No. 3. The only difference is that the boric acid was dissolved in the aqueous solution prior to spray drying in Test No. 4.

5. As in Test No. 2, the batch compositions in Test No. 5 were formulated so that the two batches would exhibit similar melting points.
6. Test No. 6 was similar to Test No. 4 in that boric acid was included in both batches and the boric acid was dissolved in the aqueous solution prior to spray drying.
7. In Test No. 7, the second ($Al_2O_3$-containing) batch was formulated to target the low temperature eutectic (1170° C.) composition between the tridymite-pseudowollastonite-anorthite phase fields.
8. As a comparative test, the batch composition in Test no. 8 was formulated as a refractory composition, falling slightly outside the preferred ranges for the first and second batches.
9. As another comparative test, the batch composition in Test no. 9 was formulated as a very refractory composition, falling substantially outside the preferred ranges for the first and second batches. In this formulation, the first pre-batch contains no CaO and the second pre-batch is substantially high in CaO.

The results of the glass melting test are presented in Table 3. The batch-free (melting) time is presented in hours (±0.3 hours) for each melting test. Also presented is a comparison with the single batch test, shown as a percent reduction in batch-free time.

TABLE 5

| Test No. | Batch-Free Time (hours) (±0.3 hrs.) | % Reduction in Batch-Free Time |
|---|---|---|
| Single Batch | 2.8 | Comparative |
| 1 | 2.8 | 0 |
| 2 | 2.3 | 18 |
| 3 | 1.8 | 36 |
| 4 | 1.8 | 36 |
| 5 | 1.8 | 36 |
| 6 | 1.3 | 54 |
| 7 | 2.8 | 0 |
| 8 | 2.8 | 0 |
| 9 | >2.5 | N/A |

As shown in Table 5, selective batch test Nos. 2-6 showed substantial reductions in the batch-free (melting) time compared with the single batch test. The best results were obtained in Test No. 6 in which boric acid was included in both batches and the boric acid was dissolved in the aqueous solution prior to spray drying. Dissolution of the boric acid is believed to provide for the uniform distribution of boric acid throughout the granule and allow boric acid to precipitate during drying forming a neck, or meniscus, between the other raw material particles. The formation of necks of boric acid between the other raw material particles will provide strength to the granule reducing the tendency for dust generation during material handling.

The refractory compositions did not show any improvement in melting rate. Test No. 9 was terminated early, but still showed large regions of unmelted batch after 2.5 hours at 1300° C.

Example 3

Additional Selective Batch Melt Tests

Glass melt tests were conducted as in Example 1, except that the batch materials for each melt test were separated into plurality of materials as two separate batches having different compositions from each other. A first batch (including CaO—$B_2O_3$—$SiO_2$—$Al_2O_3$ containing raw materials) which were granulated by a number of techniques, and a second batch (including CaO—$SiO_2$—$Al_2O_3$—$B_2O_3$—$Na_2O$ and optionally MgO containing raw materials) which were well mixed as dry powders or granulated similar to the first batch materials. The first batch granules were combined with the second batch materials (as dry powders or various forms of granulate) in a ratio to provide the overall composition stated below:

TABLE 6

| Oxide component | Target value | variance |
|---|---|---|
| $SiO_2$ | 55% | +/−0.5% |
| $Al_2O_3$ | 13.50% | +/ 0.3% |
| $B_2O_3$ | 5.50% | +/−0.3% |
| CaO | 21.5-X % | +/−0.3% |
| MgO | X | 0-2% |
| $Na_2O$ | 1.0% | +/−0.2% |
| Trace materials | <2% | |

TABLE 7

| Test | Batch portion | $SiO_2$ | $Al_2O_3$ | CaO | $B_2O_3$ | Weight Ratio First Batch:Second Batch |
|---|---|---|---|---|---|---|
| 10-66A | 1 | 10.7 | 5.3 | 8.1 | 75.6 | 14.1 |
| 11-66B | 1 | 14.2 | 5.3 | 5.5 | 75.0 | 14.0 |
| 12-66C | 1 | 17.7 | 5.2 | 2.8 | 74.3 | 13.8 |
| 14-66D | 1 | 14.0 | 5.2 | 15.5 | 65.3 | 11.9 |
| 15-66E | 1 | 20.7 | 5.2 | 10.4 | 63.8 | 11.7 |
| 16-66F | 1 | 26.7 | 5.0 | 5.2 | 63.1 | 11.6 |
| 17-66J | 1 | 20.0 | 5 | 29.1 | 45.9 | 7.95 |
| 18-66K | 1 | 31.8 | 4.8 | 18.9 | 44.5 | 7.7 |
| 19-66L | 1 | 43.0 | 4.7 | 9.2 | 43.1 | 7.5 |
| 20-66M | 1 | 23.4 | 5.9 | 34.5 | 36.2 | 5.9 |
| 21-66N | 1 | 37.4 | 5.6 | 22.1 | 34.9 | 5.9 |
| 22-66O | 1 | 50.2 | 5.5 | 10.8 | 33.6 | 5.6 |
| 23-70A | 1 | 28.4 | 10.5 | 10.9 | 50.3 | 8.9 |
| 24-72B | 1 | 59.3 | 14.8 | 25.8 | 0 | 8.9 |
| 25-80C | 1 | 22.7 | 8.2 | 10.1 | 59.0 | 10.7 |
| 26-90 | 1 | 13.8 | 5.3 | 6.2 | 39.1 | 12.5 |
| 27-73E | 1 | 18.1 | 3.7 | 10.5 | 65.7 | 15.0 |
| 28-117 | 1 | 21.9 | 6.8 | 10.0 | 56.34 | 11.6 |
| 29-G1 | 1 | 29.38 | 10.8 | 13.4 | 45.38 | 10.1 |

These materials were well mixed by hand, and then charged to crucibles for melt testing. Experiments 23 and 25-29 demonstrated a reduction in batch-free time as well as improved melt reactions.

While the invention has been illustrated and described in detail in the drawings and foregoing description, the same is to be considered as illustrative and not restrictive in character. It is understood that the embodiments have been shown and described in the foregoing specification in satisfaction of the best mode and enablement requirements. It is understood that one of ordinary skill in the art could readily make a nigh-infinite number of insubstantial changes and modifications to the above-described embodiments and that it would be impractical to attempt to describe all such embodiment variations in the present specification. Accordingly, it is understood that all changes and modifications that come within the spirit of the invention are desired to be protected.

What is claimed is:

1. A method of controlling the melting of glass batch components in a glass melter to yield a glass melt characterized by a resident melt temperature and a glass melt viscosity, comprising:

providing a plurality of raw material batch components in amounts according to a predetermined batch recipe, wherein the plurality of raw material batch components further include at least one glass-former material, at least one modifier material, and boron;

combining a first portion of the plurality of raw material batch components to yield a first pre-batch mixture characterized by a first pre-batch melting temperature from about 60 percent of the resident melt temperature and further characterized by a first pre-batch viscosity at the first pre-batch melting temperature greater than the glass melt viscosity;

mixing the first pre-batch mixture and a remaining portion of the plurality of raw material batch components to yield a batch mixture; and introducing the batch mixture into the glass melter;

wherein the first pre-batch mixture includes a first plurality of first discrete reaction members; wherein each respective first discrete reaction member is formed by pelletizing the first pre-batch mixture prior to the mixing step; and wherein each respective first discrete reaction member substantially has the composition of the first pre-batch mixture;

combining a second portion of the plurality of raw material batch components to provide a second pre-batch mixture characterized by a second pre-batch melting temperature of between about 60 percent to about 90 percent of the resident melt temperature and further characterized by a second pre-batch viscosity at the second pre-batch melting temperature greater than the glass melt viscosity;

wherein the second pre-batch mixture includes a second plurality of second discrete reaction members;

wherein each respective second discrete reaction member is formed by pelletizing the second pre-batch mixture prior to the mixing step; and wherein each respective second discrete reaction member substantially has the composition of the second pre-batch mixture; and wherein at least some of the second discrete reaction members include a core portion substantially composed of the first pre-batch mixture and an outer shell portion substantially surrounding the core portion and substantially composed of the second pre-batch mixture.

2. A method of controlling the melting of glass batch components in a glass melter to yield a glass melt characterized by a resident melt temperature and a glass melt viscosity, comprising:

providing a plurality of raw material batch components in amounts according to a predetermined batch recipe, wherein the plurality of raw material batch components further include at least one glass-former material and at least one modifier material;

combining a first portion of the plurality of raw material batch components to yield a first pre-batch mixture characterized by a first pre-batch melting temperature from about 60 percent of the resident melt temperature and further characterized by a first pre-batch viscosity at the first pre-batch melting temperature greater than the glass melt viscosity;

combining a second portion of the plurality of raw material batch components to provide a second pre-batch mixture characterized by a second pre-batch melting temperature of between about 60 percent to about 90 percent of the resident melt temperature and further characterized by a second pre-batch viscosity at the second pre-batch melting temperature greater than the glass melt viscosity;

mixing the first pre-batch mixture, the second pre-batch mixture, and a remaining portion of the plurality of raw material batch components to yield a batch mixture; and introducing the batch mixture into the glass melter:

wherein the first pre-batch mixture includes a first plurality of first discrete reaction members;

wherein each respective first discrete reaction member is formed by pelletizing the first pre-batch mixture prior to the mixing step;

wherein each respective first discrete reaction member substantially has the composition of the first pre-batch mixture;

wherein the second pre-batch mixture includes a second plurality of second discrete reaction members;

wherein each respective second discrete reaction member is formed by pelletizing the second pre-batch mixture prior to the mixing step;

wherein each respective second discrete reaction member substantially has the composition of the second pre-batch mixture; and wherein at least some of the second discrete reaction members include a core portion substantially composed of the first pre-batch mixture and an outer shell portion substantially surrounding the core portion and substantially composed of the second pre-batch mixture.

* * * * *